US009506269B2

(12) United States Patent
Armstrong et al.

(10) Patent No.: US 9,506,269 B2
(45) Date of Patent: Nov. 29, 2016

(54) COLLAPSIBLE SHADE DEVICE

(75) Inventors: Michael Armstrong, Mission Viejo, CA (US); Robert Friedman, Waikoloa, HI (US)

(73) Assignee: AMERICAN QUALITY HOUSING, LLC, Laguna Beach, CA (US)

( * ) Notice: Subject to any disclaimer, the term of this patent is extended or adjusted under 35 U.S.C. 154(b) by 641 days.

(21) Appl. No.: 13/166,266

(22) Filed: Jun. 22, 2011

(65) Prior Publication Data

US 2012/0042920 A1 Feb. 23, 2012

Related U.S. Application Data

(63) Continuation-in-part of application No. 12/640,959, filed on Dec. 17, 2009, now abandoned.

(51) Int. Cl.
*E04H 15/38* (2006.01)
*E04H 15/48* (2006.01)
*E04H 15/06* (2006.01)
*E04H 15/00* (2006.01)

(52) U.S. Cl.
CPC ............ *E04H 15/38* (2013.01); *E04H 15/003* (2013.01); *E04H 15/06* (2013.01); *E04H 15/48* (2013.01); *Y10T 29/49826* (2015.01)

(58) Field of Classification Search
CPC .............................. E04H 15/38; E04H 15/48
USPC ....... 135/128, 132, 133, 138, 143, 151, 153, 135/115, 120.1; 403/61, 53, 55, 58, 101; 16/324, 326
See application file for complete search history.

(56) References Cited

U.S. PATENT DOCUMENTS

| 609,553 | A |   | 8/1898  | Lloyd            |         |
|---------|---|---|---------|------------------|---------|
| 1,007,829 | A | * | 11/1911 | Westbrook    | 135/133 |
| 2,036,033 | A |   | 3/1936  | Fisher           |         |
| 2,681,659 | A | * | 6/1954  | Hrinsin      | 256/25  |
| 2,829,659 | A |   | 4/1958  | Megenity         |         |
| 2,832,361 | A |   | 4/1958  | Smith            |         |
| 2,853,088 | A |   | 9/1958  | Lamborn          |         |
| 2,864,388 | A |   | 12/1958 | Oliver           |         |
| 2,864,390 | A |   | 12/1958 | Oliver et al.    |         |
| 2,960,993 | A |   | 11/1960 | Holmstrom        |         |

(Continued)

FOREIGN PATENT DOCUMENTS

CN 1836087 A 9/2006
CN 1836087 A 9/2006

OTHER PUBLICATIONS

International Search Report and Written Opinion for PCT/US2012/041979, mailed Aug. 16, 2012; 8 pages.

(Continued)

*Primary Examiner* — David R Dunn
*Assistant Examiner* — Danielle Jackson
(74) *Attorney, Agent, or Firm* — John J. Connors; Connors & Assoc pc

(57) ABSTRACT

A shade device for protecting a user from harmful sunrays is provided. The shade device may be held in the erected position with nubs such that to erect the shade device, frame support members are pushed to the erected position. To collapse the shade device, the frame support members are pushed past nubs. Accordingly, the shade device incorporates a simple push release mechanism to erect and collapse the shade device such that no assembly or disassembly of the shade device is required for tear down or set up.

2 Claims, 22 Drawing Sheets

(56) References Cited

U.S. PATENT DOCUMENTS

| | | | |
|---|---|---|---|
| 3,190,300 A * | 6/1965 | Wear | 135/126 |
| 3,890,989 A | 6/1975 | Kuxhouse et al. | |
| 4,355,650 A | 10/1982 | Beaudry | |
| 4,612,948 A | 9/1986 | Simpson | |
| 4,687,278 A * | 8/1987 | Grabbe et al. | 439/842 |
| 4,748,995 A | 6/1988 | Viglione | |
| 4,884,589 A | 12/1989 | Simpson | |
| 5,159,947 A | 11/1992 | Chuang et al. | |
| 5,556,156 A | 9/1996 | Kirk | |
| 5,690,134 A | 11/1997 | McCauley | |
| 5,842,495 A | 12/1998 | Egnew et al. | |
| 6,095,172 A | 8/2000 | Trapp et al. | |
| 6,123,091 A | 9/2000 | Flynn et al. | |
| 6,209,558 B1 | 4/2001 | Viglione | |
| 6,478,038 B1 | 11/2002 | Le Gette et al. | |
| 7,051,481 B2 | 5/2006 | Delavega et al. | |
| 7,178,540 B2 | 2/2007 | Eder | |
| 7,938,134 B2 | 5/2011 | Adams | |
| 2003/0066550 A1 | 4/2003 | Al-Ghamdi | |
| 2006/0162758 A1 | 7/2006 | Painchaud | |
| 2007/0181172 A1 | 8/2007 | Harrison | |
| 2007/0295380 A1 | 12/2007 | Glaeser | |
| 2009/0242009 A1 | 10/2009 | Adams | |
| 2011/0146737 A1 | 6/2011 | Friedman et al. | |

OTHER PUBLICATIONS

PCT/US2010/060806 Search, Feb. 11, 2011, Island Shade Shacks, Inc.
CN2010850062342.6 OfAction, Sep. 5, 2014, Swimways Corporation.

* cited by examiner

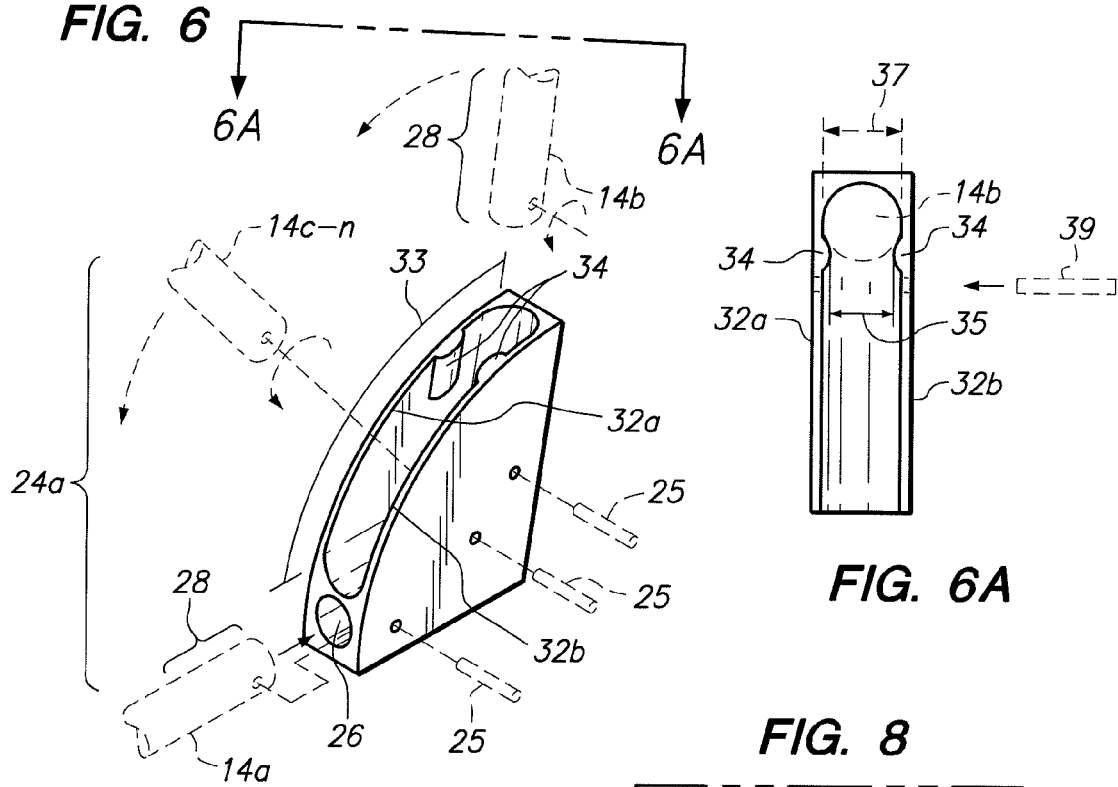
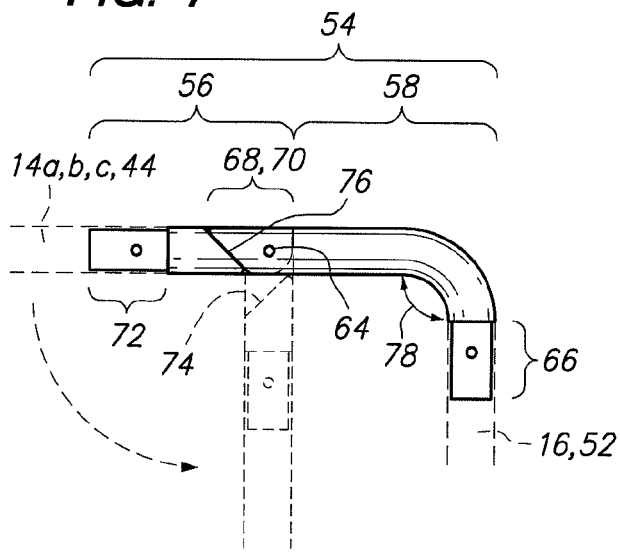
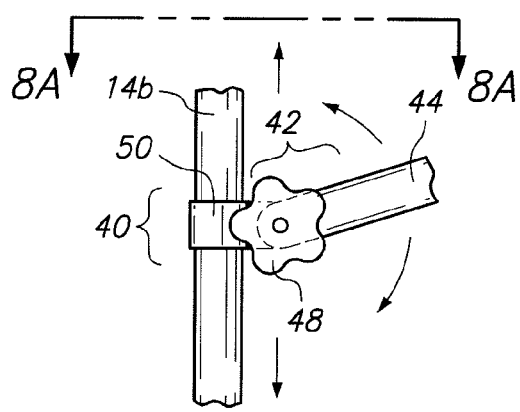
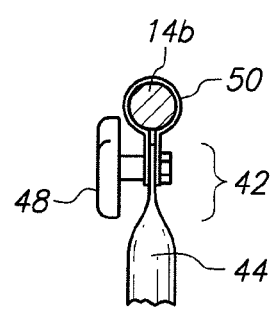

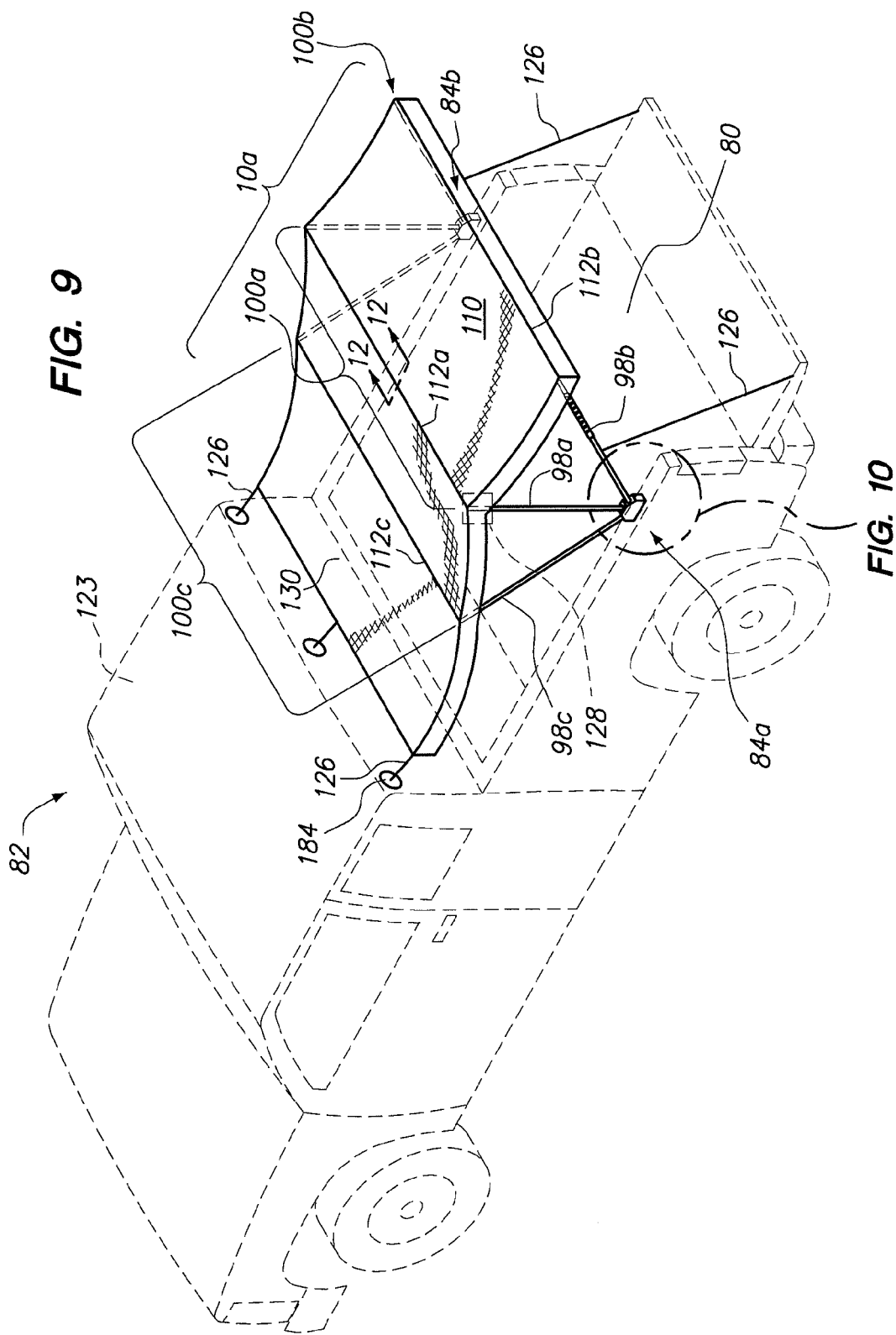

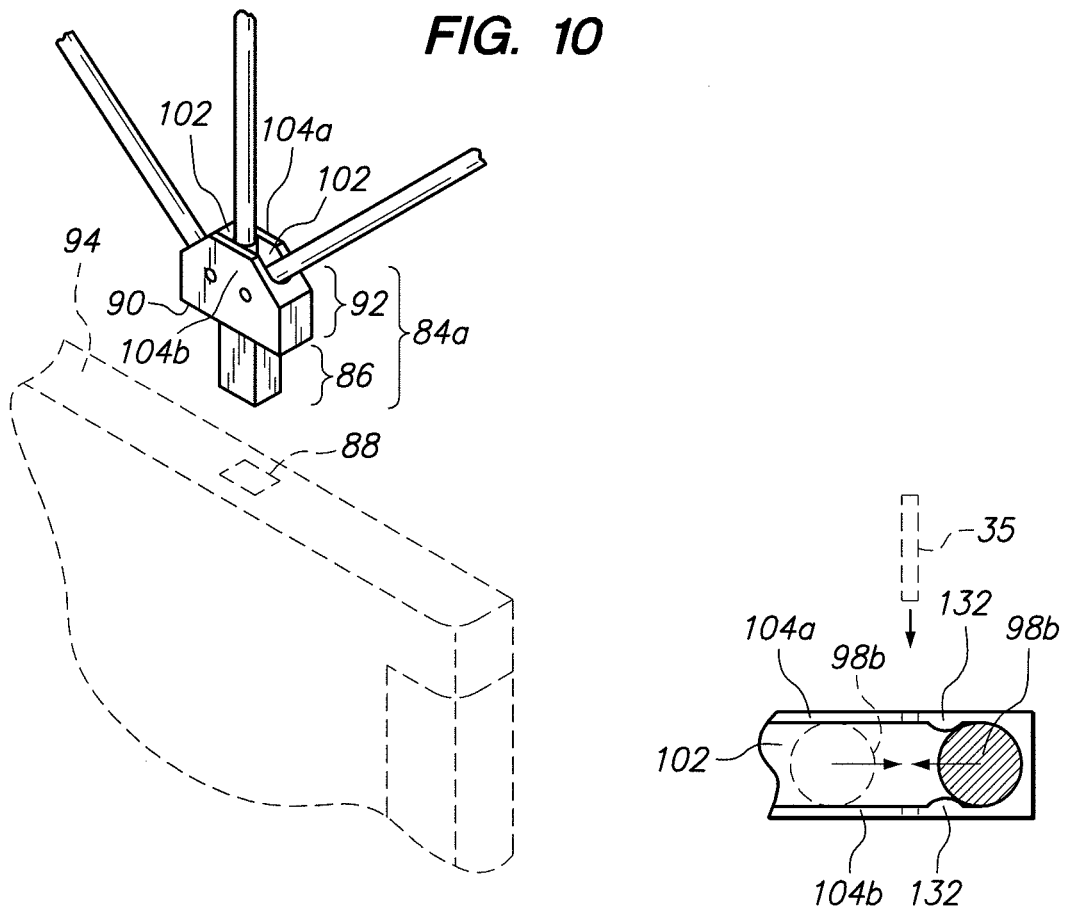
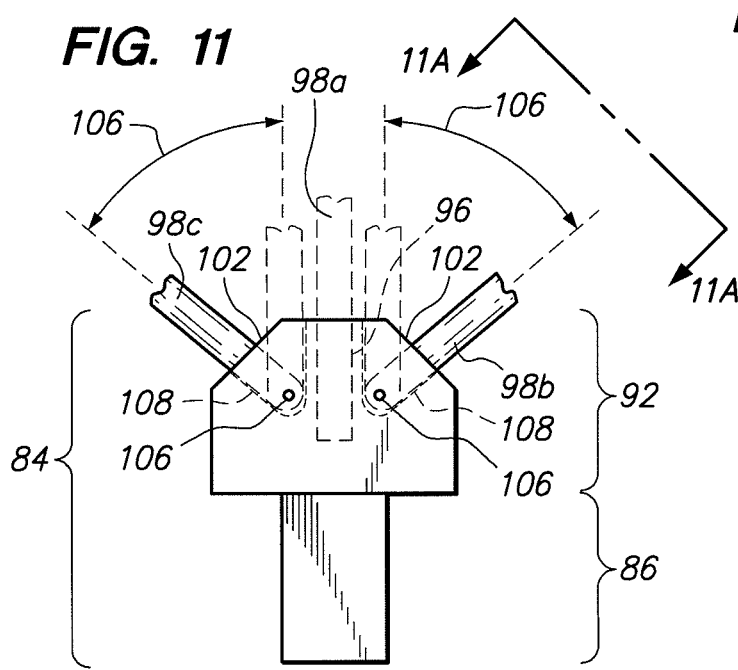

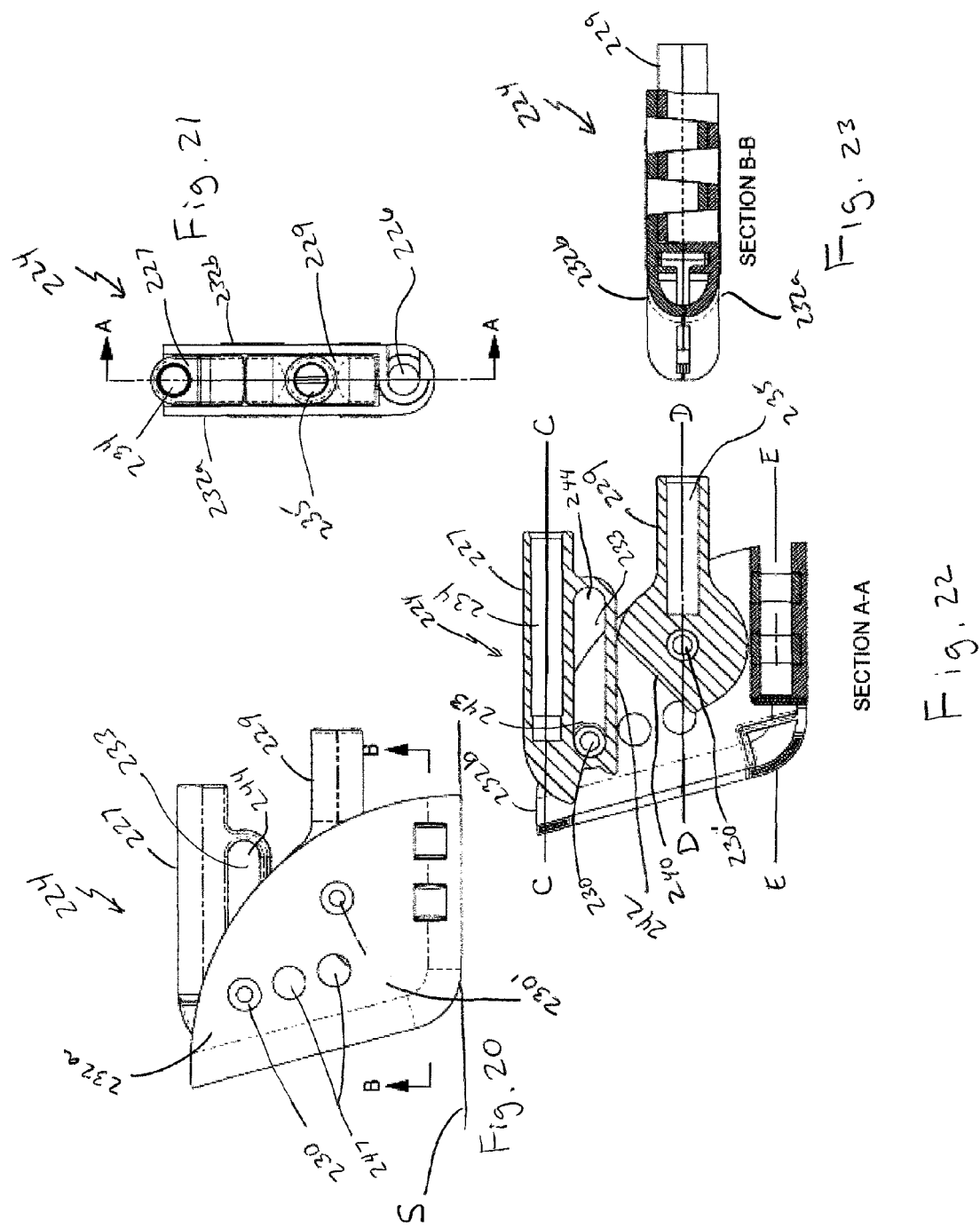

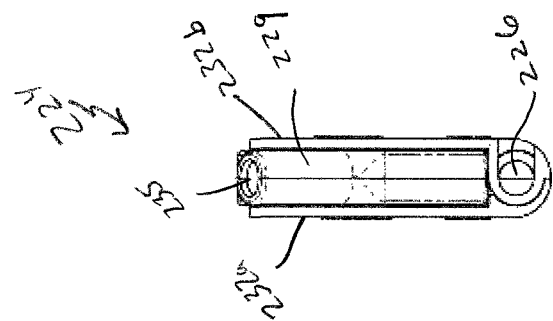
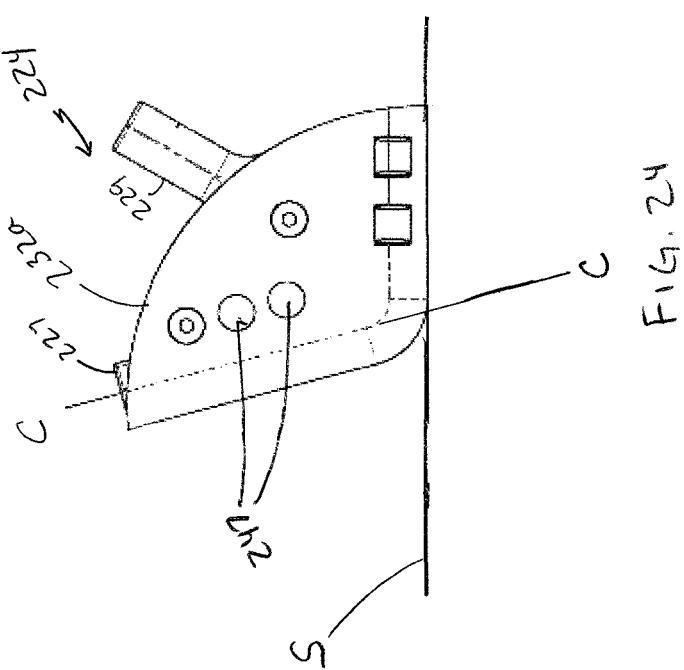

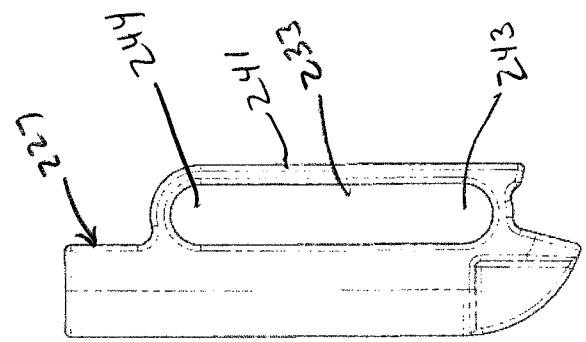
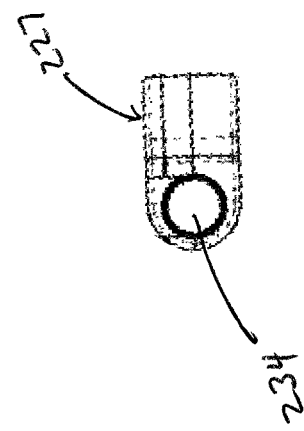
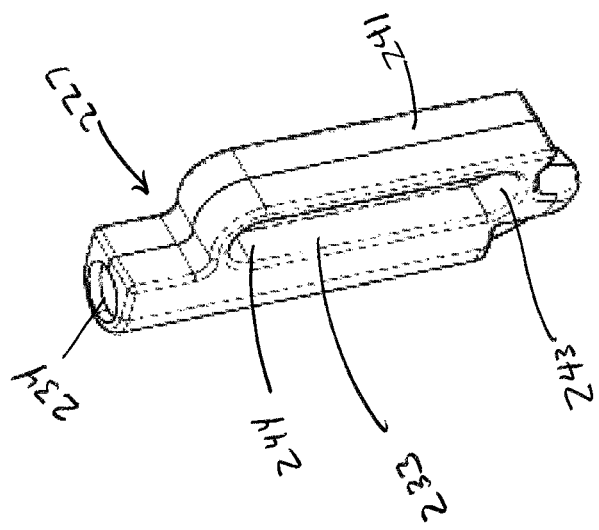

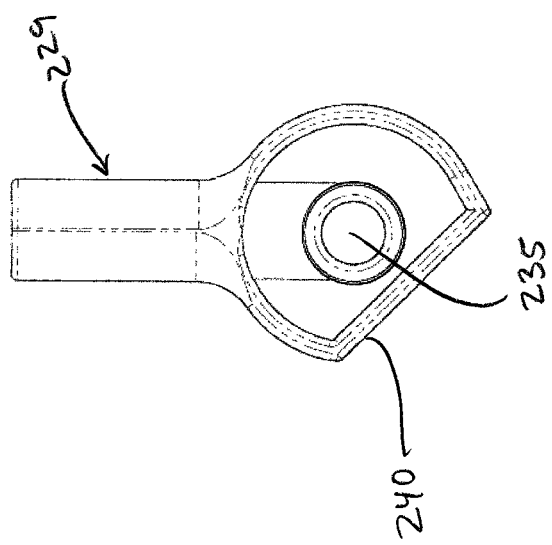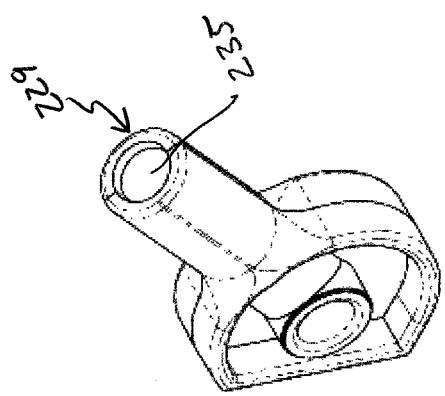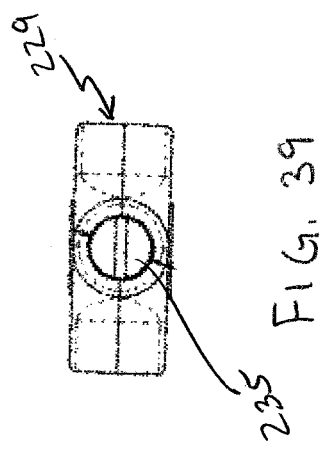

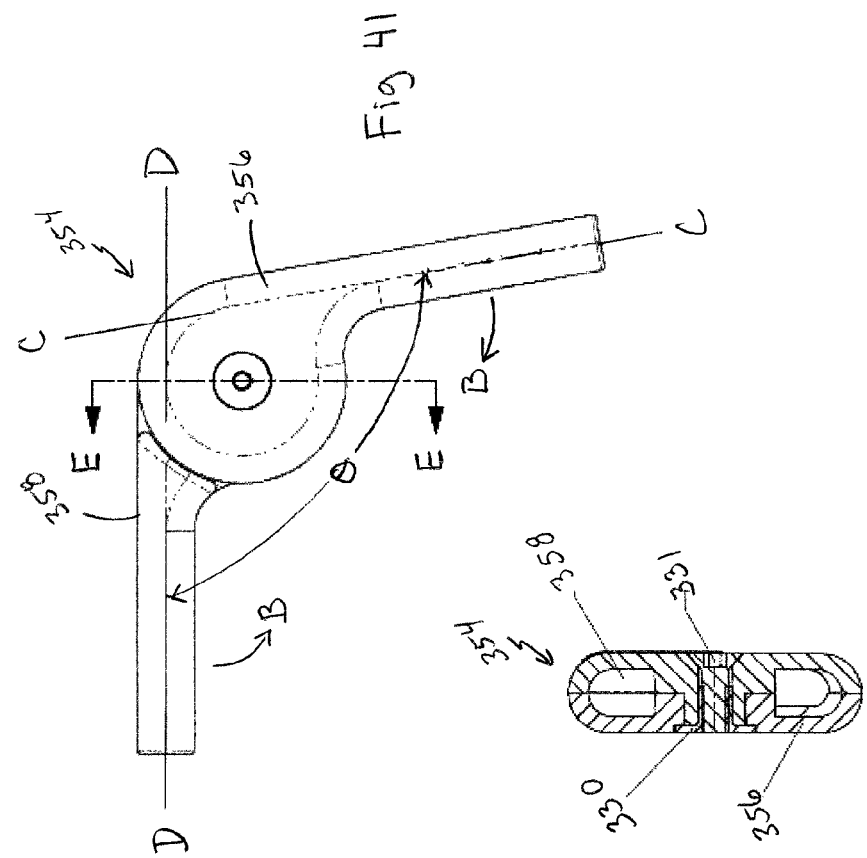
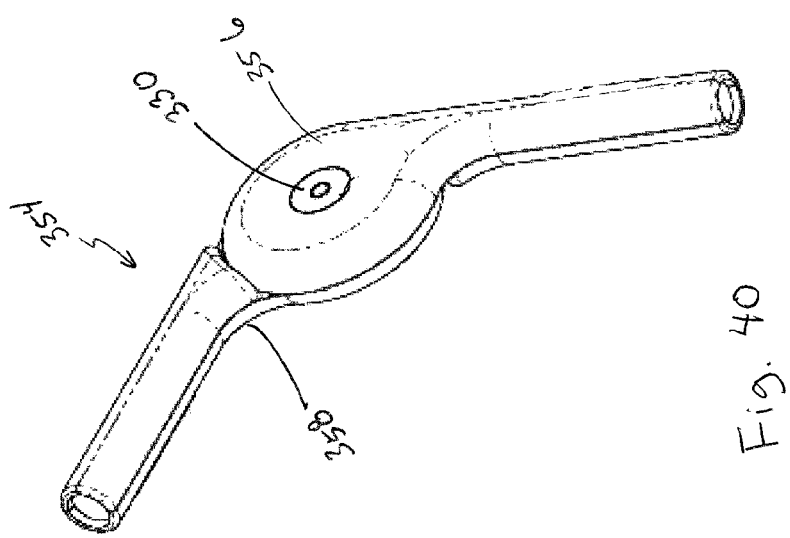

COLLAPSIBLE SHADE DEVICE

CROSS-REFERENCE TO RELATED APPLICATIONS

This application is a continuation-in-part of U.S. patent application Ser. No. 12/640,959, filed Dec. 17, 2009, entitled "Collapsible Shade Device," the disclosure of which is hereby incorporated by reference herein in its entirety.

STATEMENT RE: FEDERALLY SPONSORED RESEARCH/DEVELOPMENT

Not Applicable

BACKGROUND

The present invention relates to a shade device.

In tropical resort areas vacationers seek solitude and isolation from the crowds. Vacationers seek isolated beach areas away from the crowds and modern society in order to relax in a stress free environment. In these isolated areas, the vacationer wants to be shielded or protected from the harmful and harsh sunrays. The sunrays may damage the vacationer's eyes and skin. Sun block and sunglasses may be inadequate since direct contact with the sunrays may cause the person's skin temperature to be elevated beyond a comfortable range. The sunrays may cause the vacationer to squint. As a solution, resorts and beach communities have provided lounge chairs with sun umbrellas, canopies, etc. that block the sun's rays and protect the vacationer. Unfortunately, these prior art shade devices may be very bulky and heavy. In order to maneuver these prior art shade devices, the vacationer may need the assistance of a resort employee to aid in the set up and assembly of these devices at the particular location desired by the vacationer. Motorized vehicles may have to be used to pull the prior art shade device to the particular location desired by the vacationer. These interruptions are unwanted intrusions by resort employees. The sound of motorized vehicles takes away from the relaxing atmosphere of these beach communities.

In a different scenario, during tailgating, a group of friends or individuals will park at a destination and share food, drinks and companionship before an event (e.g., football, soccer, etc.). The party will occur on the back of a pickup truck. The bed of the pickup truck provides the staging area upon which the food may be laid out and the drinks may be placed. Also, the truck bed may provide an area that people can set up a lawn chair to sit and lounge during the party. Unfortunately, during the daytime, the harsh sunrays beat down on the participants and expose the food and drinks to the warm rays of the sun.

Accordingly, there is a need in the art for an improved shade device.

BRIEF SUMMARY

The various embodiments and aspects of the shade device disclosed herein address the needs discussed above, discussed below and those that are known in the art.

A first embodiment of the shade device may be set up on a flat generally horizontal surface such as the beach, grass, etc. to provide protection from the harsh sunrays of the sun. When the shade device is set up on the ground, the shade device provides a seat portion upon which the user may sit to protect the user from the dirty ground. The seat portion may be part of a fabric layer that is extended upon a frame of the shade device to block the sun's rays and protect the person sitting on the seat portion from the harmful sunrays. To fold the shade device for easy carry and compact storage, a frame support member is pushed past nubs that hold up the shade device. In particular, the shade device may have two or more frame support members (i.e., collectively, the frame) that are collapsible upon each other. From the erected position, the shade device may be collapsed by an easy push release system. One of the frame support members is held in place by nubs. To initiate the collapse of the shade device, the frame support member is pushed over or past the nubs. After the frame support members are collapsed upon each other, legs of the frame support members are folded inward at joints. The seat portion can be wrapped around the legs and top support members of the frame support members to prevent the legs from unfolding or flopping around during transport, storage, etc. Once the seat portion is wrapped around the legs of the top support members, a strap may be engaged to secure the seat portion around the legs and the top support members. The straps may also have a shoulder strap such that the user may conveniently carry the folded or collapsed shade device on his/her shoulder. The shade device may be fabricated from lightweight material and hollow tubular construction to further reduce the weight of the overall shade device for easy transport (e.g., shoulder carry).

To erect the shade device, the straps are disengaged. The seat portion is unwrapped from the legs and the top support members. The legs are folded outward at the joints. The frame support members are erected. To this end, the legs or frame support member is pushed over or past nubs. Since a fabric layer which provides the means for protecting the user from the harsh sunrays are attached to the top support members of the frame support members, the fabric layer is extended out when the frame support members are disposed or traversed to the erected position. At the erected position, legs of the frame support member may be held in position by the nubs formed in a bracket that pivotally attaches all of the legs of the frame support members. The shade device requires no additional tools to set up or tear down. The shade device is lightweight due to its construction and minimal parts. It is also intuitive in its set up and tear down.

In a second embodiment of a shade device, the same may be mounted to a truck bed to provide shade and protection from harmful sunrays during a tailgating party. The shade device may have a central and stationary frame support member. Two pivoting support members, one disposed on each side of the fixed central support member may be disposed on each side of the fixed support member. The two pivoting support members are biased to the erected position due to gravity. The two pivoting support members may optionally be held or maintained in the erected position due to nubs.

To erect the second embodiment of the shade device, the same is initially wrapped in a rear portion of a fabric layer with straps securing the rear portion and a shoulder strap for convenient carry and transport. To erect the second embodiment of the shade device, the straps are disengaged such that the rear portion of the fabric layer can be unwrapped and expose legs of the frame support members. The legs of the frame support members are pivoted outward. Protrusions formed on a bottom side of the brackets which pivotally attach the frame support members are inserted into stake bed holes. Once the brackets are inserted into the stake bed holes, a central or stationary frame support member is oriented generally straight upward. One or more pivoting support members are disposed adjacent the stationary frame support member. For example, one pivoting support member may be attached to the bracket and extend over the tailgate or toward the tailgate of the bed. Optionally, another pivoting support member is disposed on the other side of the central support member. Gravity is allowed to pivot the one or more pivoting support members to an extended position. It is also contemplated that nubs may be formed in the bracket to hold the one or more pivoting support members in position.

At least one of the one or more pivoting support members and/or the stationary frame support member may have a telescoping leg for configuring the fabric layer disposed on the top support members of the frame support members as desired. Bungee cords, tie downs or elastic members may be used to secure the shade device to the bed of the truck in the event wind attempts to blow the shade device off of the truck bed. The brackets may also have clips to hold the shade device to the truck bed.

To collapse the shade device, the straps, tie downs, or bungee cords are removed from the shade device. The pivoting frame support members are folded toward the central fixed support member. To do so, the pivoting support members are pushed past the nubs. The shade device is removed from the stake bed holes. The legs of the frame support members are pivoted inward. The rear portion of the fabric layer is used to wrap the legs and the top support members of the frame support members. A strap is engaged to secure the rear portion about the legs and the top support members of the frame support member. Shoulder straps are attached to the fabric layer or the securing straps to aid in convenient shoulder carry or transport of the shade device.

The fabric layer used in both the first and second embodiments of the shade device may have an SPF protective coating or feature. The legs and top support member of the frame support members may be fabricated so as to be lightweight. By way of example and not limitation, the legs and top support member may have a tubular construction, be fabricated from lightweight aluminum, carbon fiber, steel, titanium, wood, etc.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4 is an illustration of the collapsible shade device shown in FIG. 1 with legs of the support members folded in.

FIG. 6 is an enlarged perspective view of a bracket of the collapsible shade device shown in FIG. 1.

FIG. 6A is a view from an upper view of the bracket shown in FIG. 6.

FIG. 7 is an enlarged side view of a joint of the collapsible shade device shown in FIG. 1 for pivoting legs of the support member inward.

FIG. 8 is an enlarged side view of a sliding knuckle of the collapsible shade device shown in FIG. 1.

FIG. 8A is a top view of the sliding knuckle shown in FIG. 8.

FIG. 9 is an environmental view of a second embodiment of the collapsible shade device for a truck bed.

FIG. 10 is an illustration of a bracket for the second embodiment of the collapsible shade device shown in FIG. 9.

FIG. 11 is a side view of the bracket shown in FIG. 10.

FIG. 20 is a side view of a bracket according to an embodiment, shown in a collapsed position.

FIG. 21 is an end view of the bracket of FIG. 20.

FIG. 22 is a cross-sectional view of the bracket of FIG. 20, taken along line A-A in FIG. 21.

FIG. 23 is a cross-sectional view of the bracket of FIG. 20, taken along line B-B in FIG. 20.

FIG. 24 is a side view of the bracket of FIG. 20 shown in an erected position.

FIG. 25 is a top view of the bracket of FIG. 24, shown in the erected position.

FIG. 26 is an end view of the bracket of FIG. 24, shown in the erected position.

FIG. 34 is a perspective view of a first pivot member of the bracket of FIG. 20.

FIG. 35 is a side view of the first pivot member of FIG. 34.

FIG. 36 is a top view of the first pivot member of FIG. 34.

FIG. 37 is a perspective view of a second pivot member of the bracket of FIG. 20.

FIG. 38 is a side view of the second pivot member of FIG. 37.

FIG. 39 is a top view of the second pivot member of FIG. 37.

FIG. 40 is a perspective view of a corner joint member, according to an embodiment, shown in an erected position.

FIG. 41 is a side view of the corner joint member of FIG. 40, shown in the erected position.

FIG. 42 is a cross-sectional view of the corner joint ember of FIG. 40 taken along line E-E in FIG. 41.

DETAILED DESCRIPTION

Figure 1:
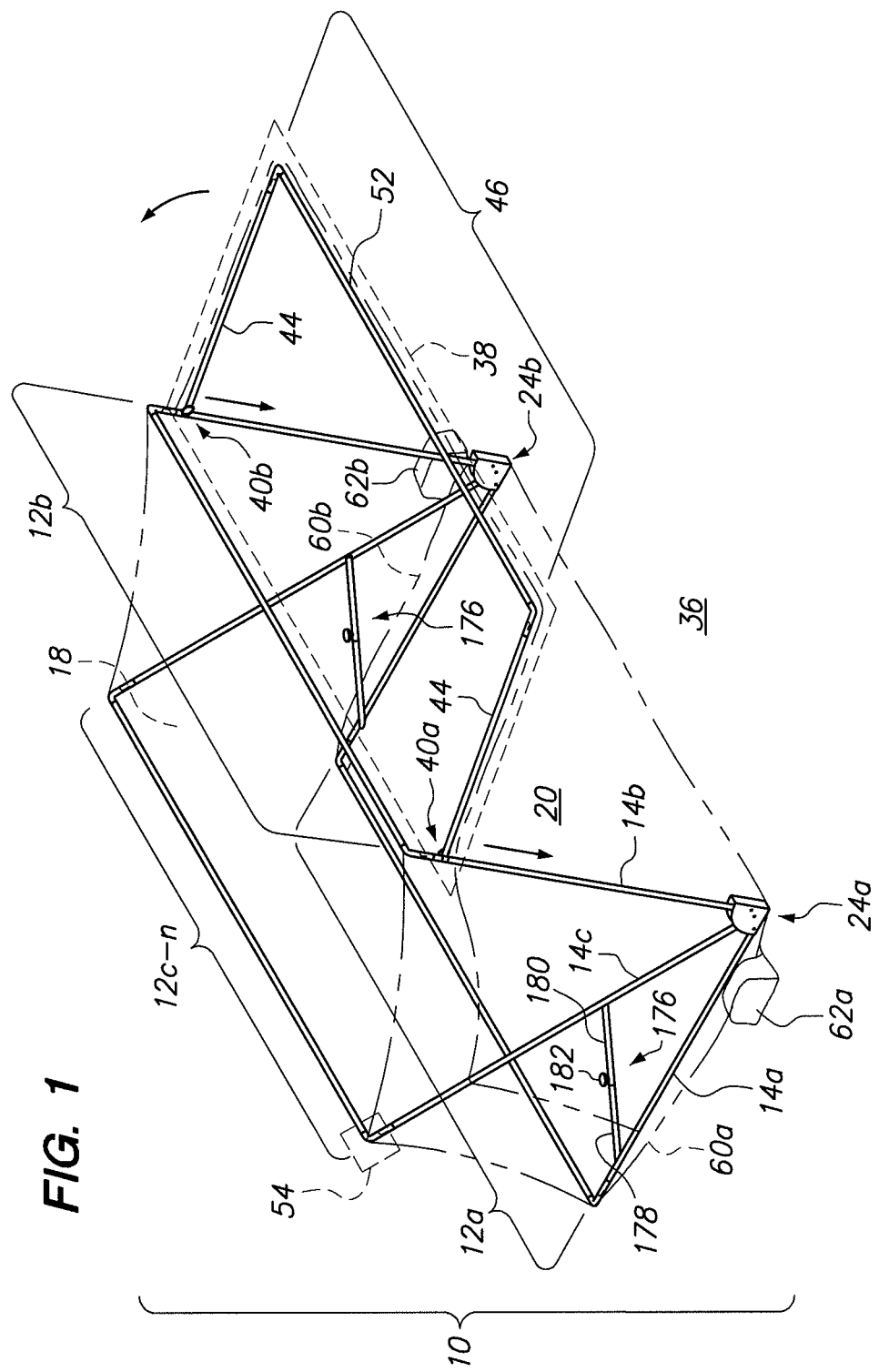
FIG. 1 is a perspective view of a collapsible shade device.
Figure 4:
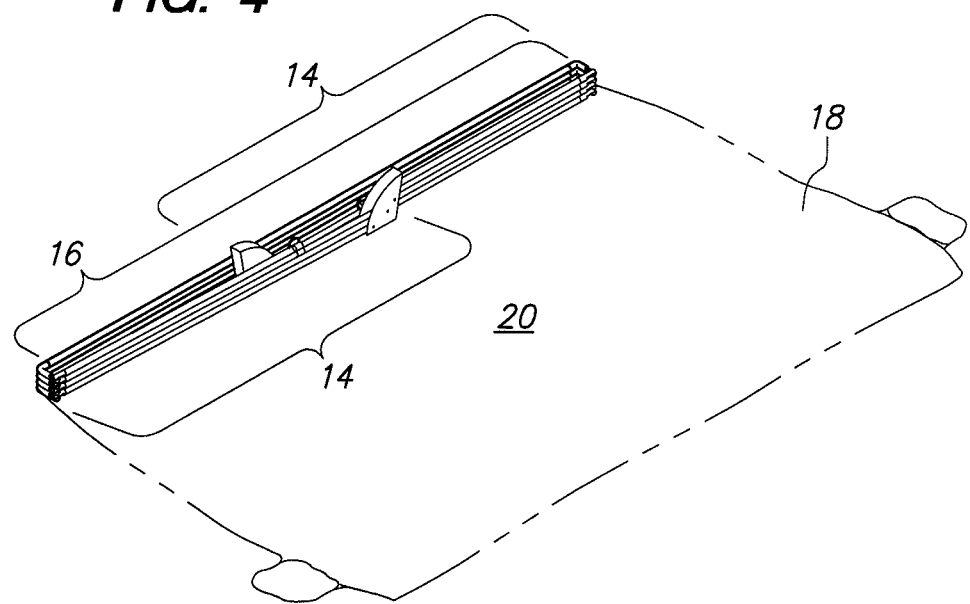
Figure 5:
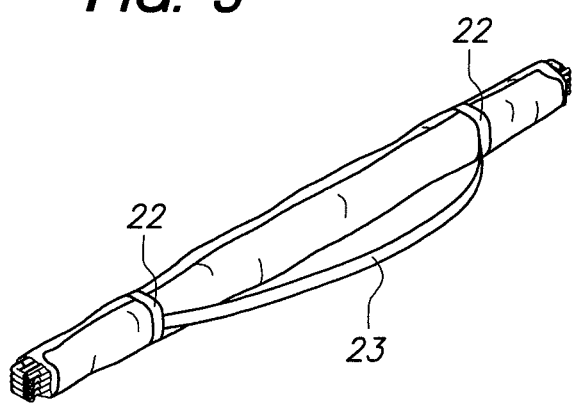
FIG. 5 is an illustration of the collapsible shade device shown in FIG. 1 in a wrapped or carry configuration.

Referring to the drawings, a collapsible shade device 10 is shown. The collapsible shade device 10 may have a plurality of frame support members 12a-c that are traversable between an erected position (see FIG. 1) and a collapsed position (see FIG. 3). To traverse the frame support members to the collapsed position, one of the frame support members may be held up by nubs as will be discussed below. The frame support member is pushed past the nub to allow the frame support members to be collapsed upon each other. This provides for a simple push release system. Once the frame members 12 are in the collapsed position, legs 14 of the frame support members 12 may be pivoted inward (see FIG. 4) wherein the left and right legs 14 of the frame support members 12 are generally parallel with a top member 16 of the frame support members 12. A fabric layer 18 may be attached to top support members 16 of the frame support members 12 and may be sufficiently long such that the fabric layer 18 provides a seat portion 20 that can be spread out on the ground upon which the collapsible shade device 10 is erected, as shown in FIG. 1. Also, the seat portion 20 may be used to wrap the legs 14 and the top member 16 of the frame support members 12, as shown in FIG. 5. The seat portion 20 serves a dual purpose, namely, 1) protecting the user while sitting and 2) wrapping for forming a package.

The user may roll the top support members 16 and legs 14 within the fabric layer 18, and more particularly, within the seat portion 20 of the fabric layer 18. After wrapping, securing straps 22 (see FIG. 5) may be wrapped around the collapsed shade device 10 and tied or secured to prevent loosening and unwrapping of the various members 12, 14, 16 during transport or storage. The securing straps 22 may also have a shoulder strap 23 for convenient transport of the collapsed shade device 10. The securing strap 23 may be attached to the fabric layer 18.

Conversely, to erect the shade device 10, the securing straps 22 are disengaged. The above steps are reversed. To traverse the frame support members 12 to the erected position, one or more of the frame support members 12 may pivot within a bracket 24 and be pushed past nubs to lock the shade device in the erected position, as discussed herein. Based on the foregoing discussions, it is apparent that the collapsible shade device 10 provides for an easy to erect and collapse which does not require assembly and/or disassembly and a lightweight device for convenient and easy carry and transport.

In a further embodiment, the collapsible shade device 10a may also be implemented to provide shade for a truck bed during tailgating, as shown in FIG. 9.

Referring now to FIG. 1, the collapsible shade device 10a may be deployable on sand, grass, or any other flat surface 36 upon which a person or other animal may sit or rest. The collapsible shade device 10 provides shade from the sun such that the user is protected from harmful and harsh sunrays.

The collapsible shade device 10 may have left and right brackets 24a, b which may be identical to each other or a mirror configuration with each other. For the purposes of simplicity, a discussion of the brackets 24a, b will focus on the left bracket 24a. However, it is understood that the right bracket 24b may be identical or a mirror configuration of the left bracket 24a.

The left bracket 24a (see FIG. 6) may be fabricated from a generally rigid and lightweight material such as plastic, metal, carbon fiber, composite, etc. The left bracket 24a may have a through hole 26 (see FIG. 6) that snugly receives a distal end portion 28 of a left leg 14a of a first frame support member 12a (see FIG. 1). The distal end portion 28 may be fixedly secured to the through hole 26 of the bracket 24 by way of adhesive, pin 25, or other attachment methods. A leg 14b (see FIG. 6) of a second frame support member 12b (see FIG. 1) may be pivotally attached to the left brackets 24a. By way of example and not limitation, a distal end portion 28 of the leg 14b of the second frame support member 12b may be pivotally pinned to side plates 32a, b of the left bracket 24a with pin 25.

Figure 3:
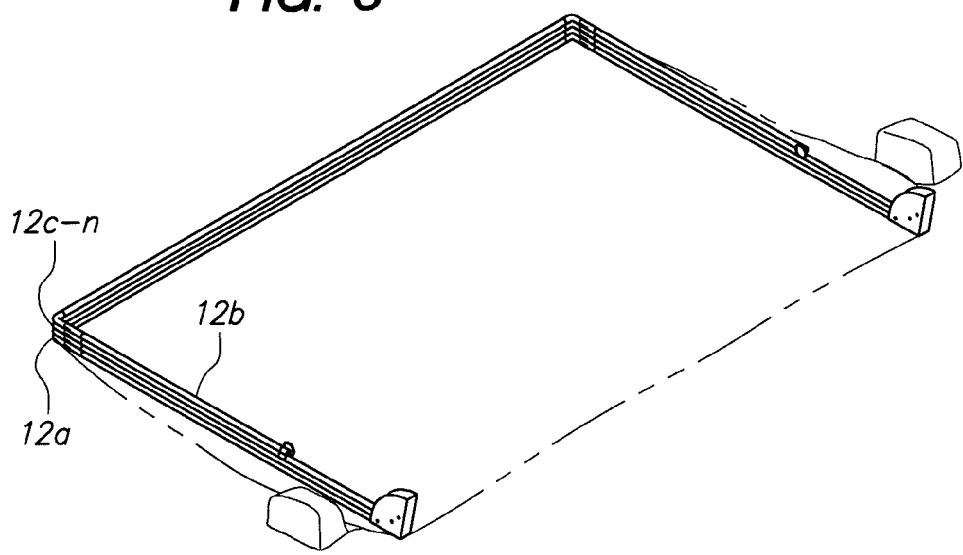
FIG. 3 is an illustration of the collapsible shade device shown in FIG. 1 with frame support members and the awning in a collapsed position.

One or more additional frame support members 12c-n may be pivotally attached to the left and right brackets 24a, b between the first and second frame support members 12a, b, as shown in FIG. 1. In FIG. 1, one additional support member 12c is pivotally attached to the left and right brackets 24a, b between the first and second frame support members 12a, b. The second frame support member 12b and the one or more additional frame support members 12c-n may be collapsed or laid upon the first frame support member 12a, as shown in FIG. 3. When erecting the shade device 10, the second frame support member 12b may be pivoted to the erected position, as shown in FIG. 1. At the erected position, the fabric layer 18 which is attached to the top support members 16 of the frame support members 12a, b, c-n pulls the one or more additional frame support members 12 upward. The fabric layer 18 remains taut between the second frame support member 12b and the one or more additional frame support members 12c-n. As such, the fabric layer 18 is taut between the second frame support member 12b and the additional frame support member 12c. The second frame support member 24b may be pivoted so as to be parallel with the first frame support member 12a when the shade device 10 is collapsed. The second frame support member 12c may be rotated toward the erected position one-hundred degrees (100°) or past the vertical plane until the second frame support member 12b is locked into position as discussed herein. It is also contemplated that the maximum angle of pivot for the second frame support member 12b may be within about forty degrees (40°) to one-hundred-eighty degrees (180°).

Referring now to FIG. 6, the side plates 32a, b of the left and right brackets 24a, b form a channel 33 through which the legs 14b of the second frame support member 12b and the legs 14c-n of the one or more additional frame support members 12c-n may traverse as they 12b, c-n pivot. As the second frame support member 12b is traversed from the collapsed position to the erected position, the legs 14b of the second frame support member 12b traverse within the channel 33 formed by the side plates 32a, b. At the end of the pivot stroke for the frame support member 12b, legs 14b of the second frame support member 12b may be pushed over or ride over nubs 34 (see FIGS. 6 and 6A) and may be snapped into place. To this end, a distance 35 between the nubs 34 may be less than a width 37 of the legs 14 of the frame support member 12b. To allow the legs 14 of the second frame support member 12b to ride over the nubs 34, (1) the side plates 32a, b may flex slightly outward, (2) the legs 14b of the second frame support member 12b may bend slightly inward or (3) both actions may occur. The rigidity of the side plates 32a, b as well as the rigidity of the legs 14 of the second frame support member 12b may be designed so that the second frame support member 12b remains in the upright position and locked in place by the nubs 34 during use. The seat portion 20 of the fabric layer 18 is spread about the ground 36 such that the user can lay down or rest on the seat portion 20 and be protected from dirt or undesirable contaminants disposed on the ground 36. The fabric layer 18 attached to the top members 16 of the second frame support member 12b and the one or more additional frame support members 12c-n provide shade to the user and protects the user from harmful and harsh sunrays. The fabric layer 18 may be attached to the top member 16 of the frame support members 12 by forming a loop as will be discussed below in relation to a second embodiment of the shade device 10a.

Preferably, the legs 14b of the second frame support member 12b are traversed beyond the vertical plane such that the second frame support member 12b is pulled down on the opposite side due to gravity. This assists in holding the position of the second frame support member 12b in the erect position by the nubs 34 since gravity and the nubs 34 are holding the second frame support member 12b in the erect position. The further the second frame support member 12b is traversed past the vertical plane (e.g., 90°), the more gravity assists in holding the position of the second frame support member 12b in the erect position.

Additionally, nubs 34 may be formed in the brackets for each of the legs 14c-n such that the nubs 34 for the second frame support member do not do all of the work to hold up the shade device. Rather, each of the nubs 34 for each of the legs 14c-n carry its own weight. This also enables the second frame support member 12b to be partially opened.

To traverse the shade device 10 to the collapsed position from the erected position, the second frame support member 12b is pushed such that the legs 14b of the second frame support member 12b is pushed over or ride over nubs 34. This allows the second frame support member 12b and the one or more additional frame support members 12c-n to be collapsed upon the first frame support member 12a. The shade device 10 may then be folded as discussed herein. The nubs 34, side plates 32a, b and the legs 14 define a push release mechanism that allows easy and convenient collapse of the shade device 10 which requires no assembly to erect or collapse the shade device 10.

Figure 2:
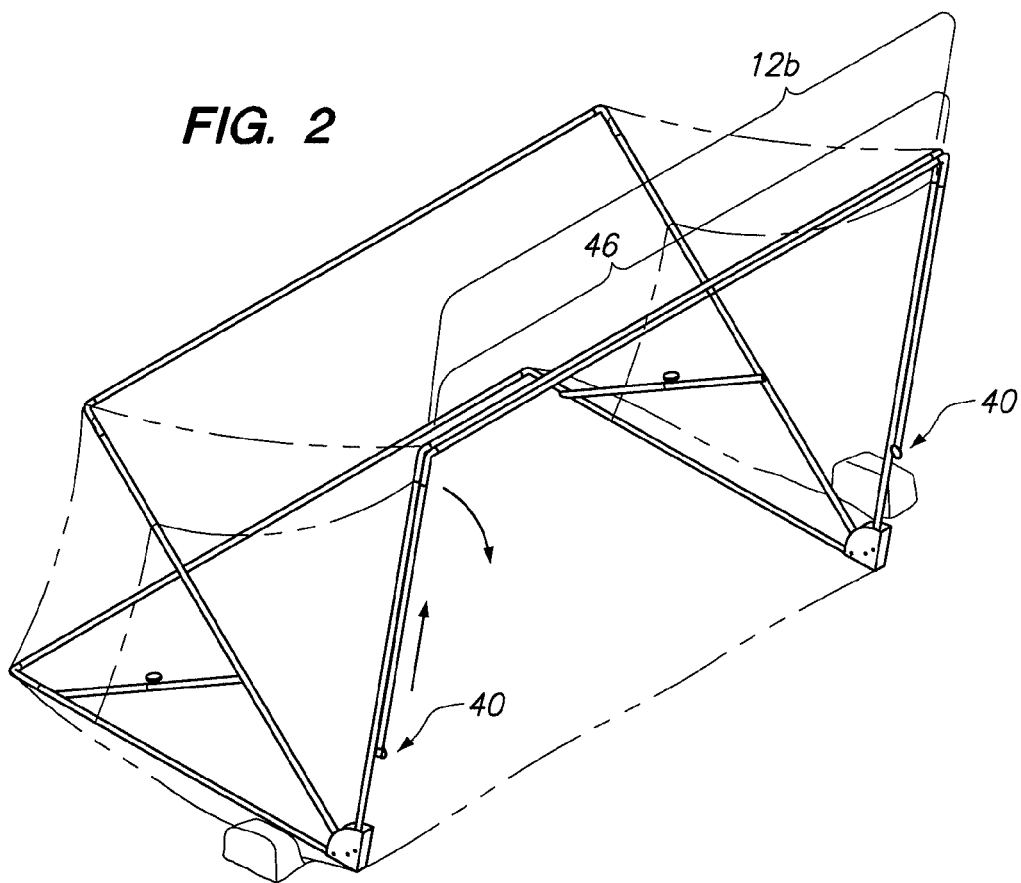
FIG. 2 is an illustration of the collapsible shade device shown in FIG. 1 with an awning in a collapsed position.

The shade device 10 may additionally have an optional awning 38 which fits the profile of the second frame support member 12b when not in use, as shown in FIG. 2. To deploy the awning 38, a sliding knuckle 40 (see FIGS. 2 and 8) attaches the distal end portions 42 of legs 44 of an awning support member 46 to legs 14 of the second frame support member 12b. The legs 44 of the awning support member 46 may pivot about the sliding knuckle 40. Additionally, the sliding knuckle 40 may slide up and down a length of the legs 14b of the second frame support member 12b. The sliding knuckles 40a, b may be loosened via a knob 48. Loosening the knob 48 allows the sliding knuckles 40a, b to slide up and down the length of the legs 14 of the second frame support member 12b and also allows the awning support member 46 to pivot about the sliding knuckle 40. The sliding knuckles 40a, b may each have a strap 50 disposed about the circumference of the legs 14b of the second frame support member 12b. When the knob 48 is tightened, the strap 50 is tightened about (i.e., frictionally engages) the leg 14b to prevent sliding of the sliding knuckles 40a, b along the length of the legs 14b. Additionally, when the knob 48 is tightened, the knob 48 squeezes down on the distal end portions 42 of the legs 44 of the awning support member 46 to prevent pivoting of the awning support member 46. The fabric layer 18 may extend from the top member 16 of the second frame support member 12b to the top member 52 of the awning support member 46.

To deploy the awning 38, the knobs 48 of the sliding knuckles 40a, b are loosened. The sliding knuckles 40a, b are slid up along the legs 14b of the second frame support member 12b as desired. Also, the awning support member 46 is rotated as shown by arrows in FIG. 2. The fabric layer 18 disposed between the top members 16, 52 of the second frame support member 12b and the awning support member 46 begins to stretch or extend out to provide additional shade to the user under the collapsible shade device 10. The angle of the awning support member 46 may be adjusted as desired by the user. The knob 48 of the sliding knuckles 40a, b are now tightened to set the awning 38. The weight of the awning 38 also assists in maintaining the shade device in the erect position. The awning 38 is pulled down by gravity toward the front of the shade device. Conversely, to collapse the awning 38, the knobs 48 of the sliding knuckles 40a, b are loosened. The sliding knuckles 40a, b are slid down (see arrow in FIG. 1) the legs 14 of the second frame support member 12b. The top member 52 of the awning support member 46 is rotated (see arrow in FIG. 1) and disposed closely adjacent to the top member 16 of the second frame support member 12b, as shown in FIG. 2. The fabric layer 18 disposed between the top members 16 and 52 may be lifted up and on top of the fabric layer 18 between the top member 16 of the second frame support member 12b and the top member 16 of the one or more additional frame support members 12c-n. Alternatively, the fabric layer 18 may hang in front of the shade device 10 to provide additional protection to the user resting under the shade device 10.

The seating portion 20 may be attached to the underside of the legs 14a of the first frame support member 12a such as with hooks and loops, adhesive, snaps, etc. and other fastening means. The left and right edges 60a, b of the seating portion 20 may extend beyond the width of the first frame support member 12a, as shown in FIG. 1. Moreover, there may be pouches 62a, b attached to the edges 60a, b of the seating portion 20. The pouches 62a, b may be filled with sand or other heavy material to mitigate the shade device 10 from blowing away. The pouches 62a, b may be disposed at the front side of the shade device 10, may extend along the entire length of the left and right side edges 60a, b of the seat portion 20 and/or may extend along the rear of the seat portion. The pouches 62a, b may be opened and closed with a zipper, hooks and loops, buttons and other closure means to fill or empty the pouches 62a, b with sand or other heavy objects. During transport, the pouches 62a, b may be emptied. Once the shade device 10 is set up at the desired location, heavy objects such as sand, rocks, etc. in the local area may be gathered and placed inside of the pouches 62a, b.

Each of the frame support members 12a-c and the awning support member 46 has legs 14a, b, c, 44 that are attached to and pivotable with opposed distal end portions of a top member 16, 52 via a joint 54 (see FIGS. 1 and 7). To pivot the legs 14, 44 about the top members 16, 52, the joint 54 is attached to both the legs 14, 44 and the top members 16, 52. The joint 54 may comprise first and second hinges 56, 58 which are pivotable about each other. By way of example and not limitation, the first and second hinges 56, 58 may have a maximum pivot angle of ninety degrees (90°) although other angles (e.g., 45° to 270°) are also contemplated. The first and second hinges 56, 58 may allow only limited angular displacement (e.g., 90°). Preferably, at most, the first and second hinges cannot be rotated more than one-hundred-eighty degrees (180)° with respect to each other. The first and second hinges 56, 58 may be pinned to each other with a pin 64. The second hinge 58 may have an L-shaped ninety degrees (90°) angle 78. Other angles 78 for the L-shaped second hinge 58 are also contemplated, such as up to one-hundred-forty-five degrees (145°). A first distal end portion 66 of the second hinge 58 may be attached to the top support member 16, 52 via any fastening means such as pinned connection, adhesive, screws, nuts and bolts, etc. The second distal end portion 68 may be attached to the first distal end portion 70 of the first hinge 56. A second distal end portion 72 of the second hinge 58 may be attached to the legs 14a-c, 44 via any fastening means such as adhesive, welding, pin connection, etc. The legs 14a-c, 44 are pivotable with respect to the top support members 16, 52 due to the rotation of the first and second hinges 56, 58. When the legs 14a-c, 44 are folded in, the first hinge 56 rotates in the counterclockwise direction shown in FIG. 7. The legs 14a-c, 44 are generally parallel or in the folded configuration with respect to the top support members 16, 52. When the legs 14a, b, c, 44 are extended back out, a first stopping surface 74 of the first hinge 56 contacts a second stopping surface 76 of the second hinge 58. When the first and second stopping surfaces 74, 76 of the first and second hinges 56, 58 contact each other, the legs 14a-c, 44 no longer extend away from the top support members 16, 52, they are fully extended. As discussed above, the second hinge 58 has an L-shaped configuration. The first and second distal end portions 66, 68 of the second hinge 58 are oriented approximately ninety degrees (90° from each other. To further stabilize the shade device 10, the angle 78 may be increased to greater than ninety degrees (90°) such that the left and right legs 14a-c of the frame support members 12a-c-n are splayed outwardly. In this event, the other components such as the seat portion 20 are also enlarged as appropriate.

Referring now back to FIGS. 1 and 2, a telescoping arm 176 may be attached to legs 14a and c. By way of example and not limitation, one telescoping arm 176 may be attached to the left legs 14a, c and one telescoping arm 176 may be attached to the other side of the frame support members 12a, c on the legs. The telescoping arms 176 may each have first and second tubes 178, 180. The first tube 178 may slide within the second tube 180 to vary an overall length of the telescoping arm 176. The length of the telescoping arm 176 may be fixed by tightening a threaded lock knob 182. The knob 182 may be threaded into the second tube 180 and butt up frictionally against the first tube 178. When the frame support members 12a, c are being spread apart to erect the shade device 10, the knob 182 is loose and the first and second tubes 178, 180 are extended. After the frame support members 12a, c are erected, the knob 182 is tightened. The telescoping arm 176 assists in holding up the frame support member 12c above the ground. The telescoping arms 176 are optional and not required. To collapse the shade device 10, the knob 182 is loosened and the frame support members 12a, c are collapsed which also compresses the telescoping arms 176. The shade device 10 can be employed as discussed herein with or without the telescoping arms 176. Other configurations of the arms are also contemplated such as telescoping arms that snap into place at preset intervals. Multiple telescoping arms 176 can be attached to the frame support member 12a and c-n as needed when additional frame support members 12d-n are incorporated into the shade device.

Referring now to FIGS. 9-13, a second embodiment of a collapsible shade device 10a is shown. The shade device 10 may be mounted to a bed 80 of a truck 82 to provide shade to users such as during a tailgating party. The collapsible shade device 10a may have left and right brackets 84a, b that function similarly to brackets 24a, b. To attach the shade device 10a to the bed 80 of the truck 82, the left and right brackets 84a, b may have a protrusion 86 that may be snuggly received into a stake pocket 88. The protrusion 86 is insertable into the stake pocket 88 and a bottom surface 90 of a body 92 of the bracket 84 rests on top of the truck bed sidewall 94. Alternatively, mount (not shown) with holes may be attached to the truck bed sidewall 94. The protrusions of the brackets 84a, b may be inserted into the holes of the mounts. The mount version may be used for those trucks that do not include stake pockets 88.

Referring now to FIG. 11, the bracket 84 may have the following structure. In particular, the body 92 may have a central aperture 96 that extends vertically upward. A leg 98a of a first frame support member 100a may be inserted into the central aperture 96 and fastened thereto with any fastening means such as adhesive, welding, pinned joint, etc. Alternatively, the leg 98a may merely be pinned to the bracket 84. The first frame support member 100a is oriented generally straight up and down when the protrusion 86 of the bracket 84 is disposed within the stake pocket 88. The shade device 10a may have one or more collapsible frame support members b-n pivotally attachable to the brackets 84. In the embodiment shown in FIGS. 9-11A, second and third frame support members 100b, c have legs 98b, c that can be pivoted within channels 102 formed in the bracket 84. The legs 98b, c may be pivotally pinned to first and second sidewalls 104a, b of the bracket 84 with pins 106. The second and third legs 98b, c may be pivoted to the expanded position shown in FIGS. 9 and 10 or to the folded configuration wherein the legs 98b, c are generally parallel with the leg 98a (see dash lines in FIG. 11).

Figure 12:
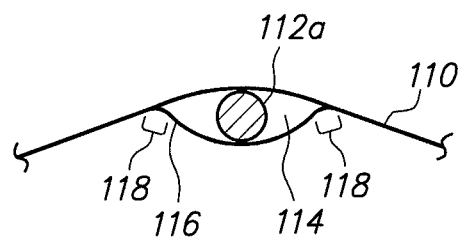
FIG. 12 is a cross sectional view of a fabric layer and top support member shown in FIG. 9.

The pivot angle 106 of the legs 98b, c may be limited by a bottom surface 108 of the channels 102. The legs 98b, c may rest on the bottom surface 108 when the legs 98b, c are pivoted to the maximum extent. Alternatively, the pivot angle 106 may be limited by the fabric layer 110 attached to top support members 112a-c and draped over one or more sides. In particular, the top support members 112a-c may be secured to the bottom side of the fabric layer 110 by any means. By way of example and not limitation, as shown in FIG. 12, the fabric layer 110 may have a loop 114 formed on the underside of the fabric layer 110. The loop 114 may be formed with a strap 116 which may be sewed to the fabric layer 110 at two different regions 118. The top support member 112a is fed through a series of loops 114 formed on the underside of the fabric layer 110. The same may also be true for the top support members 112b-c. When the second and third frame support members 100b, c are traversed from the folded configuration to the expanded position, the fabric layer 110 is pulled taut prior to the legs 98b, c contacting the bottom surfaces 108. Since the first frame support member 100a is rigidly fixed to the bracket 84 and the second and third frame support members 100b, c may generally be equally weighted, there is a balance in the weights and minimal stresses imposed on the system. Gravity also holds the shade device 10a in the open configuration without the need for nubs or pins although nubs and pins may be incorporated into the shade device 10a to maintain the open position of the legs 98b, c.

Referring now to FIG. 11A, an upper view of the bracket 84 shown in FIG. 11 is shown. The sidewalls 104a, b may optionally incorporate nubs 132 which may hold the position of the leg 98b in the open position. The leg 98b may be pushed over or ride over the nubs 132 in a similar fashion as compared to the prior embodiment discussed in relation to FIGS. 6 and 6A. The leg 98b may flex inwardly. The sidewalls 104a, b may also flex outwardly. Alternatively, the leg 98b and the sidewalls 104a, b may flex to allow the leg 98b to ride over the nubs 132. To collapse the shade device 10a, the leg 98b is pushed past the nubs 132 in the left direction as shown in FIG. 11 A. To open and maintain the shade device 10a in the open position, the leg 98b may be pushed over the nubs 132 and snap into place in the right direction as shown by the arrow in FIG. 11A. The nubs 132 may also be employed on the other side of the bracket 84 in relation to leg 98c.

Figure 13:
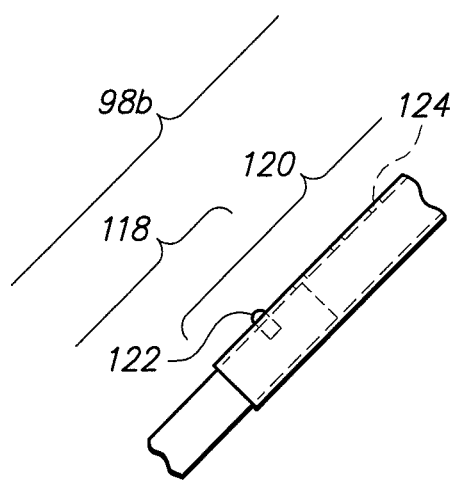
FIG. 13 is an enlarged view of a telescoping leg shown in FIG. 9.

Referring now to FIG. 13, an enlarged view of the leg 98b of the second frame support member 100b is shown. The leg 98b may comprise first and second telescoping members 118, 120. The first telescoping member 118 may have an outwardly biased push button 122. The second telescoping member 120 may have a plurality of holes 124 sized and configured to receive the button 122. The second leg 98b can be lengthened or shortened by depressing the button 122 and engaging the button 122 with one of the plurality of holes 124. In this manner, the front of the shade device 10a can be adjusted such that occupants can move into and out of the truck bed 80 more conveniently and to also adjust the amount of shade created by the shade device 10a. The fabric layer 110 may extend behind the top support member 112c toward the cab 123 of the truck 82. To this end, the fabric layer 110 may be secured to the truck bed 80 with a bungee cord or other fastening device 126. Additionally, the second frame support member 100b may be biased toward the open position with bungee cords 126.

The telescoping member 118 is implemented in both legs 98b of the second frame support member 100b. It is also contemplated that the telescoping member 118 may be employed in the first, third and any additional frame support members 100a, c-n that make up the shade device 10a. It is also contemplated that the telescoping member 118 may be implemented in the legs 14a, b, c-n of the frame support members 12a-n and the legs 44 of the awning support member 46 of the shade device 10 discussed in relation to FIGS. 1-8.

During use, the collapsible shade device 10a is easily collapsible and foldable without the need of any assembly. In the open position, a rear portion 130 of the fabric layer 110 may be attached generally horizontally to a back side of the cab 123 of the truck 82 by way of suction cups 184. From the open position shown in FIG. 9, the bungee cords, tie downs, or fastening devices 126 are removed from the set up. Thereafter, the second and third frame support members 100b, c may be pivoted upward such that the legs 98b, c are generally parallel to leg 98a. At this time, the legs 98b, c are pushed past the nubs 132. Also, the top support members 112b, c are disposed immediately adjacent the top support member 112a. If needed, the length of the leg 98b is adjusted to be equal to the length of the legs 98a, c. The user may then pull upward on the top support members 112a-c to pull the protrusion 86 of the bracket 84 out of the stake pockets 88. The shade device 10a is then laid on the ground and the legs 98a-c are folded inward at joints 128 to allow pivotal movement of the legs 98a-c to the top support members 112a-c. The joints 128 may be identical to the joints 54 discussed above. The rear portion 130 of the fabric layer 110 may be used to wrap the legs 98a-c and the top support members 112a-c such that the legs 98a-c do not move or flop around during transport and storage of the collapsible shade device 10a. Straps may be used to maintain the rear portion 130 around the legs 98a-c and top support members 112a-c. Also, a carrying strap may be attached to the straps to allow convenient carry of this lightweight, easy to transport and carry shade device. To erect the collapsible shade device 10a, the steps discussed above are performed in reverse order.

Figure 14:
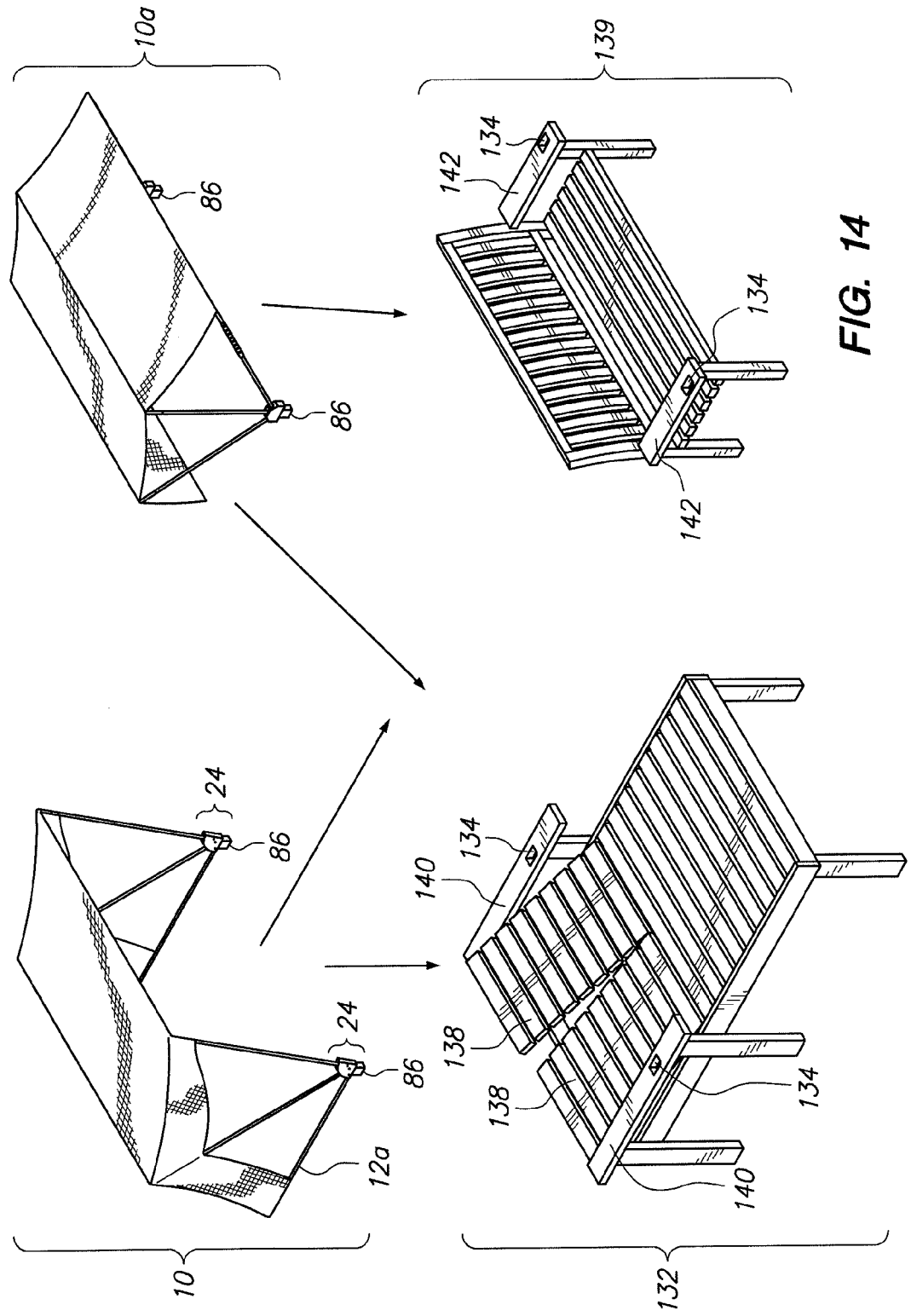
FIG. 14 is an illustration depicting the first and second embodiments of the shade device employable on a lounge chair or a bench.

Referring now to FIG. 14, the shade device 10 or the shade device 10a may be employed on a lounge chair 132. In particular, the shade device 10a may be mounted to the lounge chair 132 by inserting the protrusions 86 into corresponding pockets 134 of the lounge chair 132. The lounge chair 132 may be a doublewide lounge chair 132 with an adjustable back rest 138 that can be raised or lowered as desired by the user. Alternatively, the shade device 10a may also be employed on a bench 139. Similar to the lounge chair 132, the bench 139 may have pockets 134 for receiving the protrusions 86 of the shade device 10a.

With respect to the shade device 10, the same may also be employed on the lounge chair 132 or the bench 139. In particular, when the back rest 138 is traversed to the lowered and flat position as shown in FIG. 14, the shade device 10 may be rested on the upper surface 136 of the lounge chair 132. To stabilize the shade device 10 on the lounge chair 132, the brackets 24 of the shade device 10 may be formed with protrusions 86 that can be received into the pockets 134 of the lounge chair 132 or the pockets 134 of the bench 139. The back rest 138 may provide the horizontal support to the first frame support member 12a. Alternatively, a dedicated arm rest 140 may support the first frame support member 12a while allowing the backrest 138 to be raised or lowered as desired by the user. The shade device 10 may also be employed on the bench 139. The arm rest 142 supports the first frame support member 12a.

Figure 16:
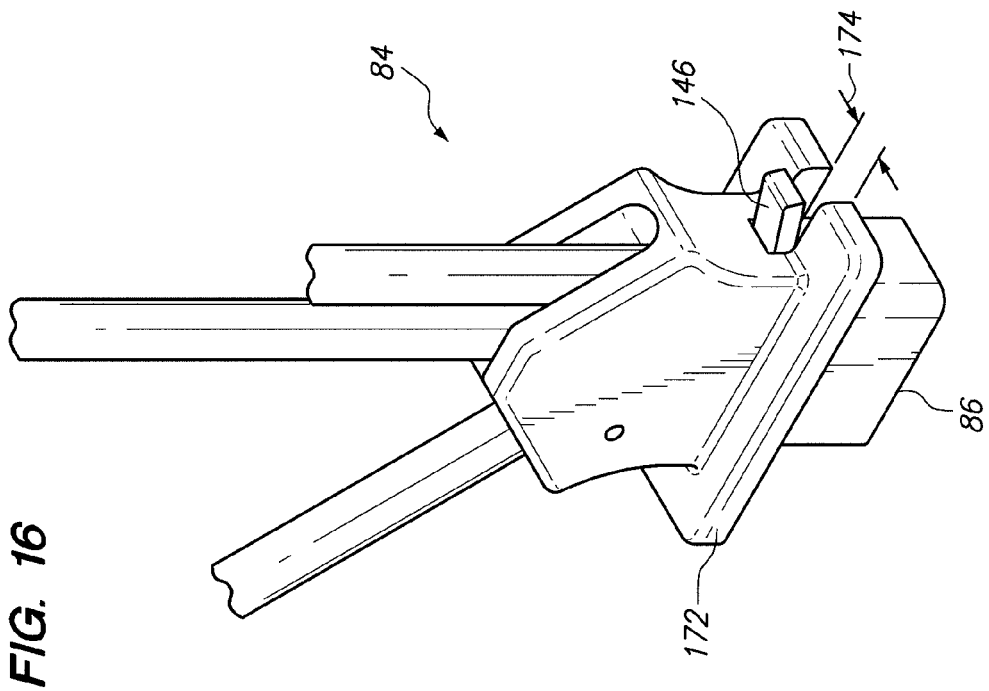
FIG. 16 is a perspective view of the bracket shown in FIG. 15.
Figure 15:
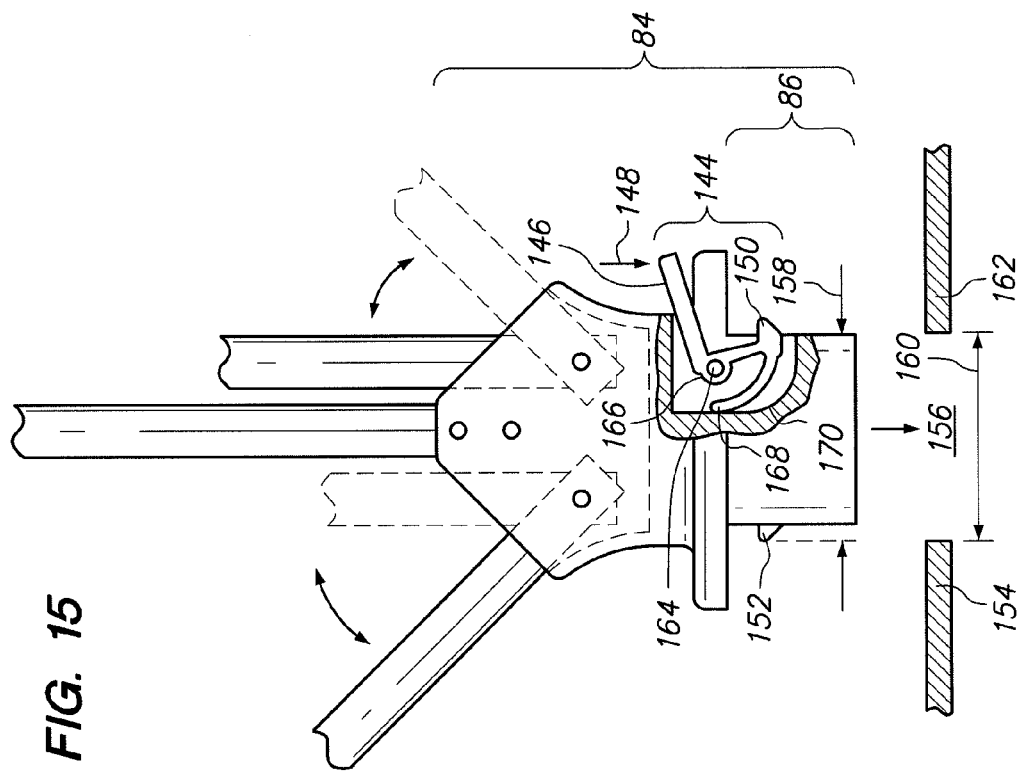
FIG. 15 is a side view of a bracket for the second embodiment of the collapsible shade device having a retractable clip.
Figure 17:
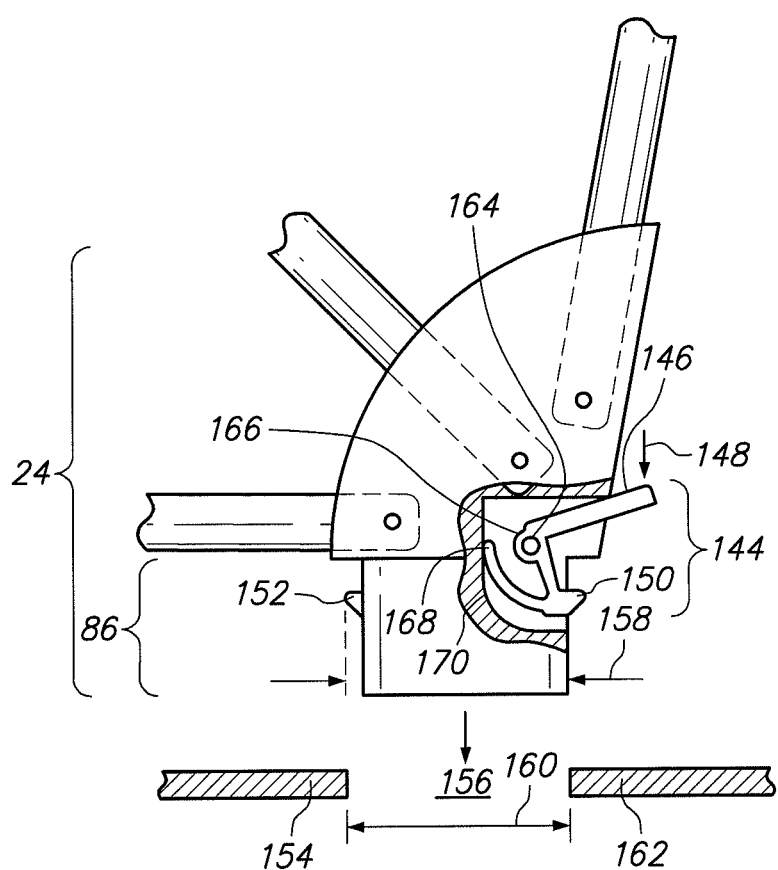
FIG. 17 is a side view of a first embodiment of the collapsible shade device having a protrusion with a retractable clip.

Referring now to FIGS. 15-17, a retractable clip for preventing pullout of the brackets 24 and 84 when protrusions 86 are inserted into pockets 134 or stake bed holes 88 or any other type of aperture for receiving the protrusions 86 are shown. To insert the protrusions 86 of the brackets 24, 84 into an aperture, the protrusions 86 are aligned to the aperture 156. The user pushes a handle 146 downward in direction of arrow 148 to retract a hook portion 150 into a body of the bracket 84, 24. An opposite side of the bracket 84, 24 has a stationary hook portion 152 although it is contemplated that the hook portion 152 may also be retractable. When inserting the protrusions 86 into the aperture, the user must lower the brackets 24, 84 into the aperture such that the stationary clip 152 is received under a lip 154 that defines the aperture 156. A width 158 between a distal end of the protrusion 152 and a side of the protrusion 86 is equal to or less than a width 160 of the aperture 156. Once the protrusion 86 is fully inserted into the aperture 156, the user releases the handle 148. The clip 144 is biased such that the hook portion 150 protrudes outwardly. Once the handle 146 is released, the hook portion 150 is disposed under a second lip 162. Accordingly, when wind blows, the brackets 24, 84 are maintained within the aperture 156.

The hook portion 150 is biased to the out position via a spring 168. In particular, the clip 144 is attached to a body of the bracket 24, 84 with a pin 164. A bushing 166 rotates about the pin 164. The handle 146 is attached to the bushing 166. Also, the hook portion 150 is also attached to the bushing 166. On an opposite side of the hook portion 150, a resilient but flexible spring 168 slides on a caming surface 170. The spring 168 is similar to a leaf spring. Due to the curvature of the caming surface 170, the hook portion 150 is biased to the outward position.

Referring now to FIG. 16, the protrusion 86 is inserted into the aperture 156, a flange 172 may rest on the lip 154, 162. The flange 172 may be split or gapped away 174 to allow handle 146 to be traversed downward and retract the hook portion 150 into the body of the bracket 84. Although not shown, the bracket 24 may also have a split to allow movement of the handle 146.

Figure 18:
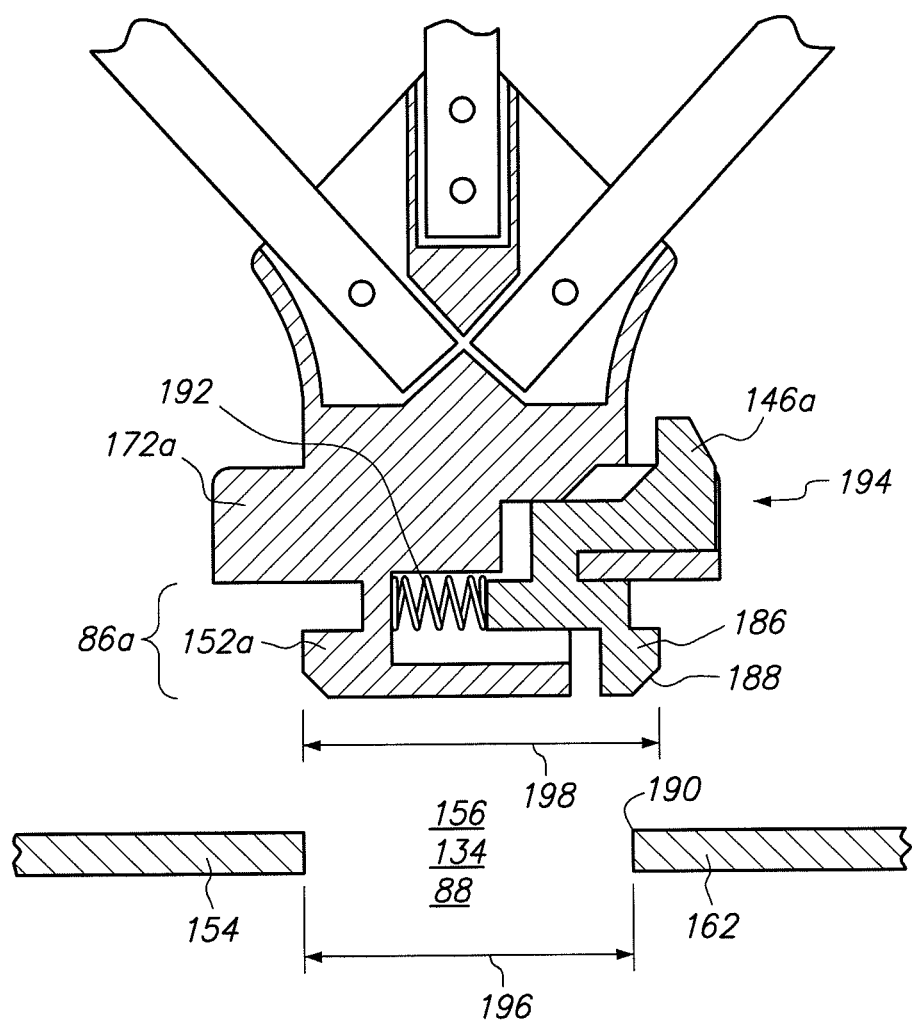
FIG. 18 is a side view of another embodiment of the retractable clip.

Referring now to FIG. 18, another embodiment of the retractable clip is shown. The retractable clip may have a handle 146a that retracts a latch 186 into the protrusion 86a. A spring 192 biases the latch 186 to the extended position. The latch 186 may have a beveled tip surface 188 which contacts an edge 190 of the aperture 156, 134, 88. When the beveled tip surface 188 contacts the edge 190 of the aperture 156, 134 and 88 the edge 190 pushes the latch 186 into the protrusion 86a so that the protrusion 86a can now be inserted into the aperture 156, 134 and 88. Once the protrusion 86a is inserted into the aperture 156, 134, 88, the spring 192 pushes the latch 186 back out. The first and second lips 154, 162 are trapped between the latch 186/stationary hook portion 152a and the flange 172a or the body of the brackets 24. To remove the protrusion 86a from the aperture 156, 134 and 88, the user pushes the handle 146a in direction of arrow 194 to retract the latch 186 back into the protrusion 86a. The protrusions 86a are removed from the apertures 156, 134, 88. A width 196 of the aperture 156, 134 and 88 may be smaller than a width 198 of the protrusion 86a when the latch 186 is in the extended position. Also, the width 198 of the protrusion 86a when the latch 186 is in the retracted position, may be less than the width 196 so that the protrusion 86a may be removed from and inserted into the aperture 156, 134, 88.

Figure 19:
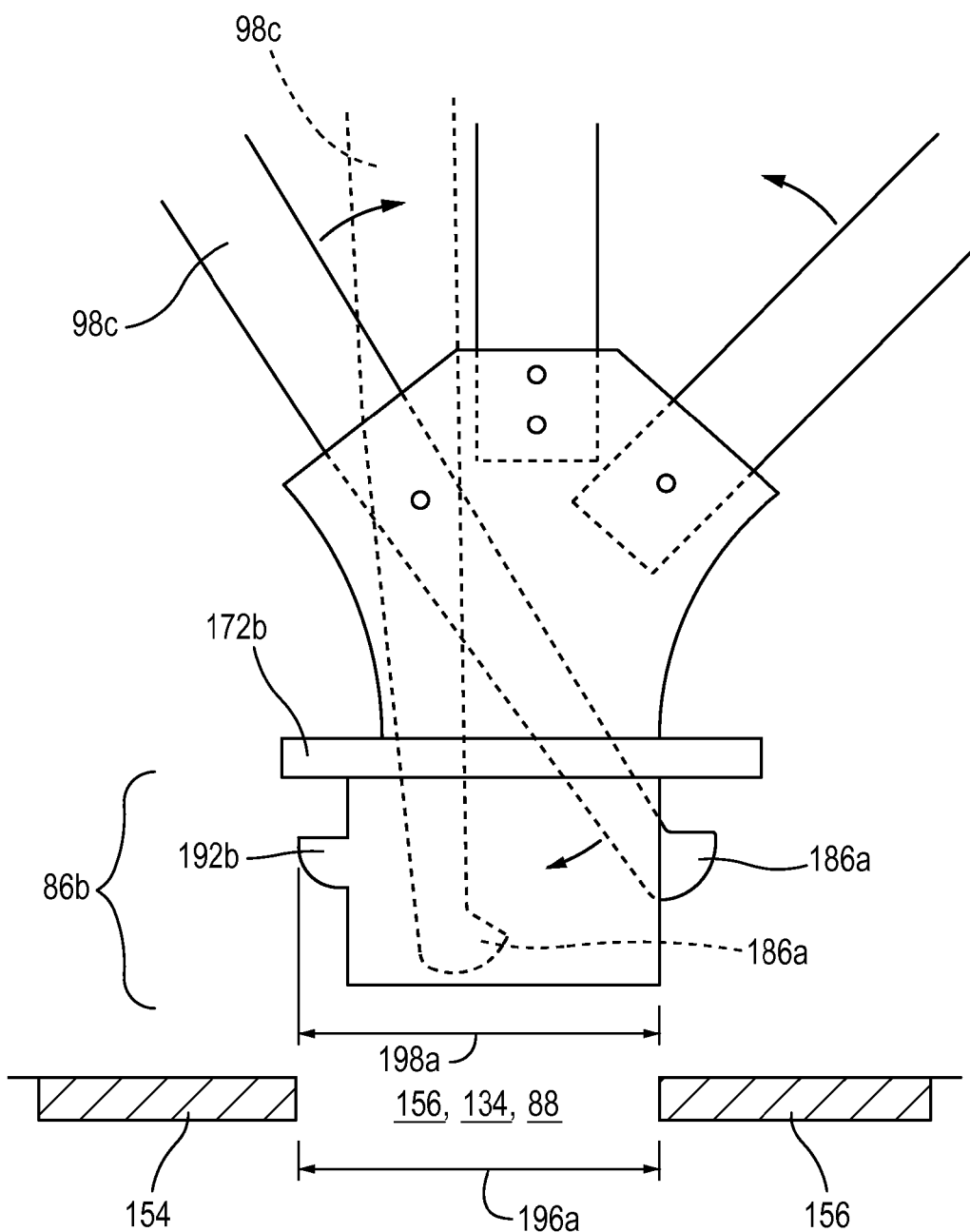
FIG. 19 is a side view of another embodiment of the retractable clip.

Referring now to FIG. 19, another embodiment of the retractable clip is shown. The retractable clip includes a stationary hook portion 152b and a retractable latch 186a. When the leg 98c is rotated inward as shown by the hidden lines in FIG. 19, the retractable latch 186a is disposed within protrusion 86b. A width 198a of the protrusion 86b is less than the width 196 of the aperture 156, 134, 88. The protrusion 86b can be inserted into aperture 156, 134, 88. The leg 98c can be rotated out as shown by solid lines. When the leg 98c is rotated to the extended position as shown in solid lines in FIG. 19, the retractable latch 186a is extended out. The first and second lips 154, 156 are trapped between the latch 186a/stationary hook portion 152b and flange 172b or the body of the brackets 24. To remove the protrusion 86b from the aperture 156, 134, 88, the leg 98c is rotated inward to traverse the latch 186a back into the protrusion 86b. The protrusion 86b can now be removed from the aperture 156, 134 and 88.

The shade device 10, 10a may be held up in the erected position by nubs 34, 132. Alternatively, the frame support member 12b may be held up with a pin 39 as shown in FIG. 6A. Also, the legs 98b, c may be held in its expanded position by pin 39 that is inserted in front of the legs 98b, c as shown in FIG. 11A.

FIGS. 20-39 illustrate an embodiment of a bracket 224 that can be used for example, in place of brackets 24a and 24b in collapsible shade device 10. A bracket 224 can be used on both the right side and the left side of the collapsible shade device 10, or bracket 224 can include a right hand version and a left hand version (e.g., a mirror image of the right hand version). The bracket 224 is described below with respect to only one side (e.g., the left side) of the collapsible shade device 10, but it should be understood that the collapsible shade device 10 can also include a bracket 224 on the right side that can be coupled to the frame support members of the collapsible shade device 10 in the same or a similar manner. The bracket 224 can be fabricated from a generally rigid and lightweight material such as plastic, metal, carbon fiber, composite, etc. as described above for previous embodiments.

The bracket 224 includes a first side plate 232a and a second side plate 232b that can be coupled together to form a housing of the bracket 224. The first side plate 232a includes a first coupling portion 225a and the second side plate 232b includes a second coupling portion 225b (see, e.g., FIG. 27) that collectively define a channel 226 when the first side plate 232a and the second side plate 232b are coupled together, as shown, for example in FIGS. 21 and 26. The channel 226 defines an axis E-E that can be substantially parallel to a support surface S when the collapsible shade device 10 is in use. The channel 226 can receive the distal end portion 28 of the left leg 14a of the first frame support member 12a. In some embodiments, the distal end portion 28 of the left leg 14a can be coupled to the bracket 224 such that the left leg 14a is stationary (e.g., does not pivot) relative to the bracket 224 when coupled thereto. The distal end portion 28 of the left leg 14a can be coupled to the bracket 224 within the channel 226, for example, using an adhesive, a pin, a friction fit, or other coupling methods. The distal end portion 28 of the left leg 14a can be removably or fixedly coupled to the bracket 224 within the channel 226.

The first side plate 232a also defines a pair of openings 247, and the second side plate 232b defines a pair of openings 248. The openings 247 and the openings 248 can be used, for example, to remove or drain sand and/or other debris that may enter into the housing of the bracket 224 during use. The bracket 224 also includes a first pivot member 227 and a second pivot member 229. The first pivot member 227 can be pivotally and slidably coupled to the first side plate 232a and the second side plate 232b with a first pin 230 and a first nut 231 (see, e.g., FIG. 27) such that the first pivot member 227 is movably disposed at least partially between the first side plate 232a and the second side plate 232b. The second pivot member 229 can be pivotally coupled to the first side plate 232a and the second side plate 232b with a second pin 230' and second nut 231' (see, e.g., FIG. 27) such that the second pivot member 229 is movably disposed at least partially between the first side plate 232a and the second side plate 232b. Thus, the first pivot member 227 has a longitudinal range of motion and a pivotal range of motion, and the second pivot member 229 has a pivotal range of motion.

The first pivot member 227 can be used to pivotally couple the distal end portion 28 of the leg 14b of the second frame support member 12b, and the second pivot member 229 can be used to pivotally couple the distal end portion 28 of the third leg 14c of the third frame support member 12c. Specifically, the first pivot member 227 defines a channel 234 that can receive the distal end portion 28 of the leg 14b of the second frame support member 12b. Similarly, the second pivot member 229 defines a channel 235 that can receive the distal end portion 28 of the third frame support member 12c. The distal end portion 28 of the left leg 14b of the second frame support member 12b and the distal end portion 28 of the left leg 14c of the third frame support member 12c can each be coupled within their respective channels 234 and 235, with for example, an adhesive, a pin, a friction fit, or other coupling methods. The distal end portion 28 of the left leg 14b of the second frame support member 12b and the distal end portion 28 of the left leg 14c of the third frame support member 12c can each be removably or fixedly coupled within their respective channels 234 and 235.

The first pivot member 227 can be moved between a first position as shown in FIGS. 20-23 and a second position as shown in FIGS. 24-27. When in its first position, an axis C-C of the channel 234 of the first pivot member 227 is disposed substantially horizontal or parallel with a support surface S on which bracket 224 and the collapsible shade device 10 is disposed. When in its second position, the axis C-C of the channel 234 is disposed at an angle transverse to the support surface S, as shown for example, in FIG. 24. To move the first pivot member 227 from its first position to its second position the first pivot member 227 can be pivoted relative to the housing (i.e., side plates 232a and 232b) via the first pin 230 and can slide downward within the housing until the pin 230 is disposed at a first end portion 244 of a slot 233 defined by the first pivot member 227 (see, e.g., FIGS. 34 and 35). Thus, the slot 233 defines the longitudinal range of motion of the first pivot member 227.

The second pivot member 229 can also be moved between a first position as shown in FIGS. 20-23 and a second position as shown in FIGS. 24-27. When in its first position, an axis D-D of the channel 235 of the second pivot member 229 is disposed substantially horizontal or parallel with the support surface S and substantially parallel to the channel 234 of the first pivot member 227 (as shown, for example, in FIG. 20). When in its second position, the channel 235 is disposed at an angle transverse to the channel 234 of the first pivot member 227, as shown, for example, in FIG. 24. To move the second pivot member 229 from its first position to its second position, the second pivot member 229 can be pivoted relative to the housing (i.e., side plates 232a and 232b) via the second pin 230'.

Figure 27:
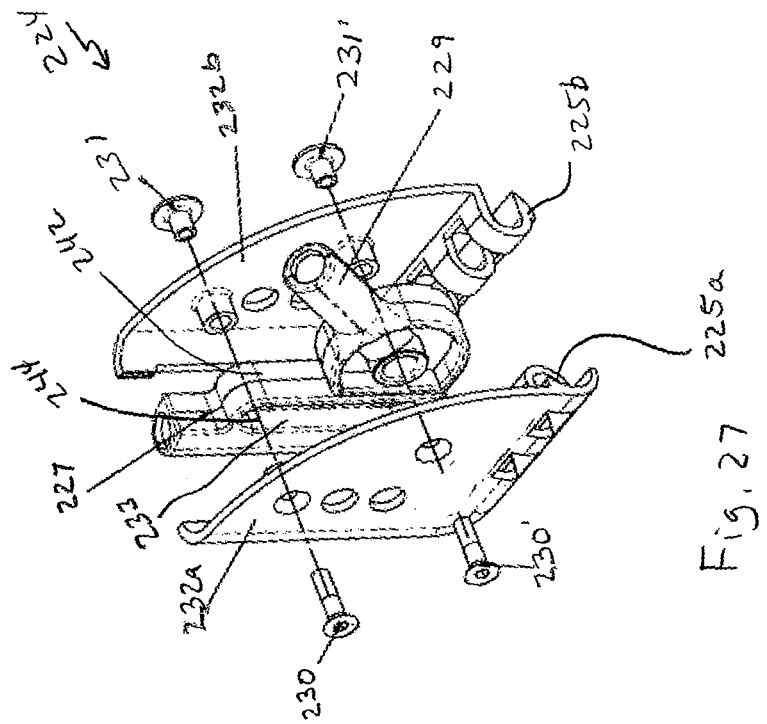
FIG. 27 is an exploded perspective view of the bracket of FIG. 24.
Figure 29:
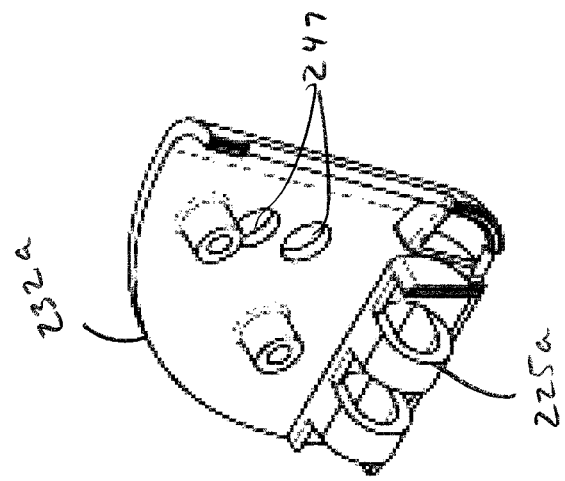
FIG. 29 is a perspective view of the first side plate of FIG. 28.
Figure 28:
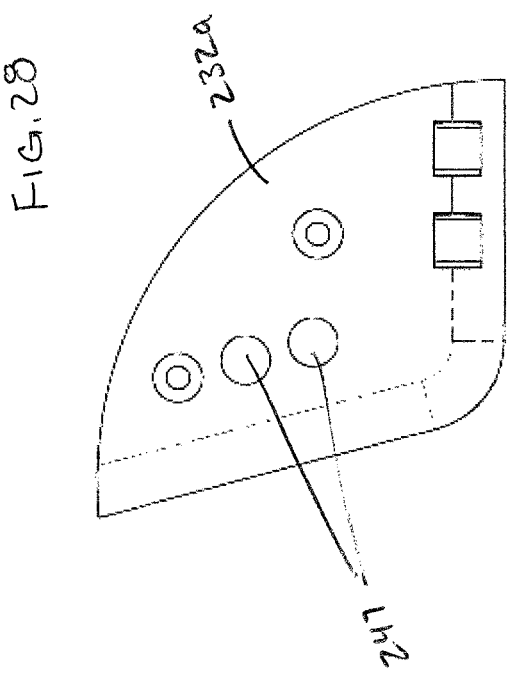
FIG. 28 is a side view of a first side plate of the bracket of FIG. 20.
Figure 30:
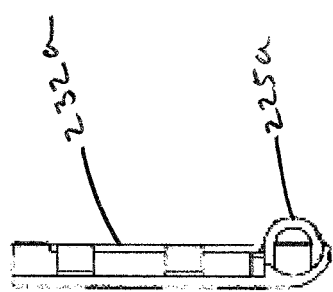
FIG. 30 is an end view of the first side plate of FIG. 28.
Figure 32:
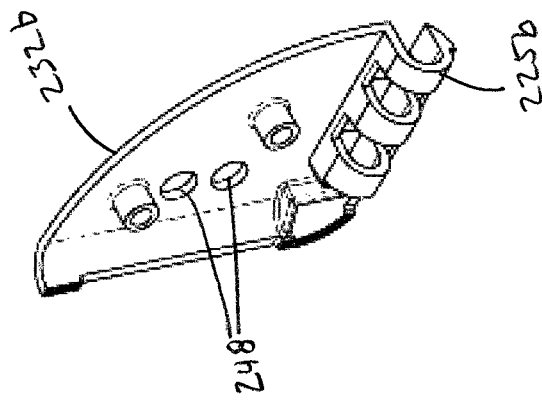
FIG. 32 is a perspective view of the second side plate of FIG. 31.
Figure 33:
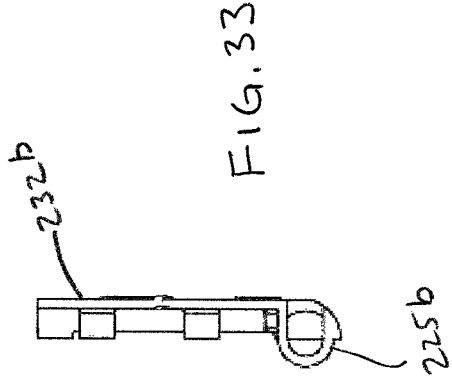
FIG. 33 is an end view of the second side plate of FIG. 31.
Figure 31:
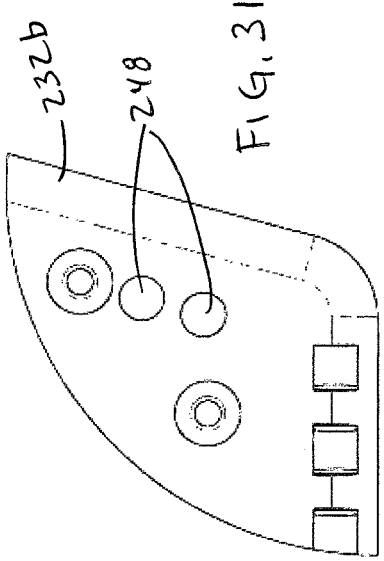
FIG. 31 is a side view of a second side plate of the bracket of FIG. 20.
Figure 46:
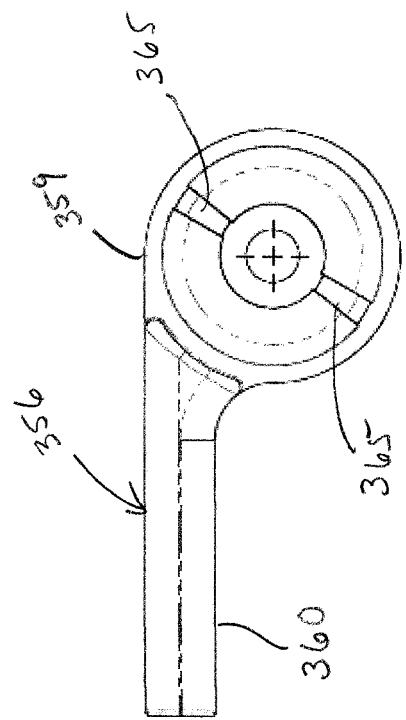
FIG. 46 is an opposite side view of the first hinge member of FIG. 43.
Figure 44:
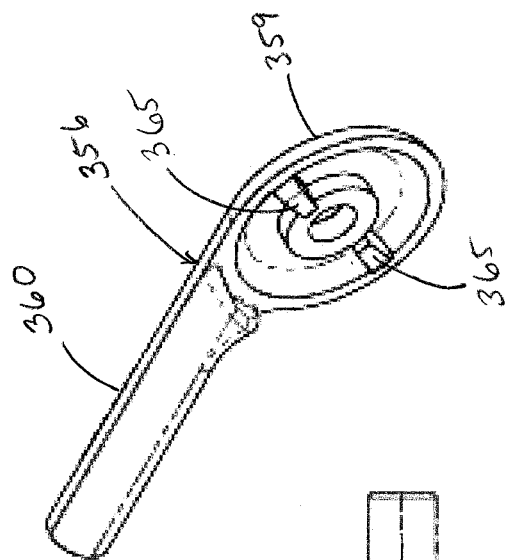
FIG. 44 is a perspective view of the first hinge member of FIG. 43.
Figure 43:
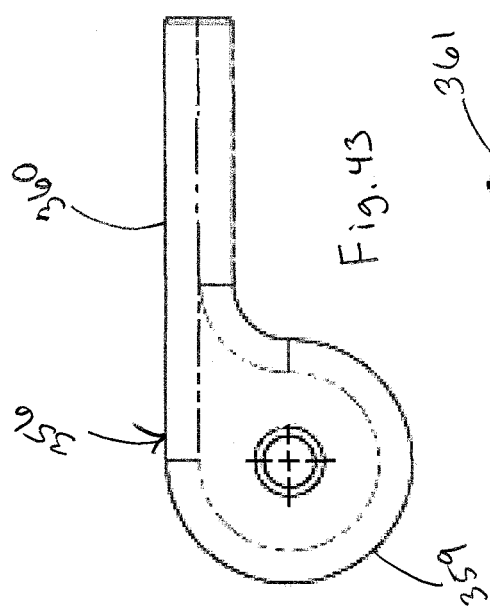
FIG. 43 is a side view of a first hinge member of the corner joint member of FIG. 41.
Figure 45:
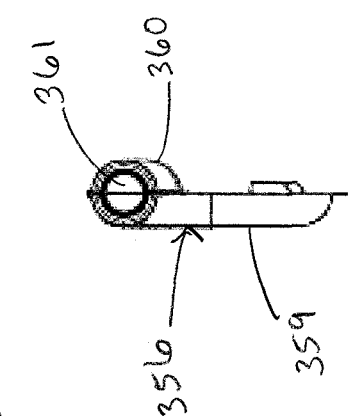
FIG. 45 is an end view of the first hinge member of FIG. 43.
Figure 48:
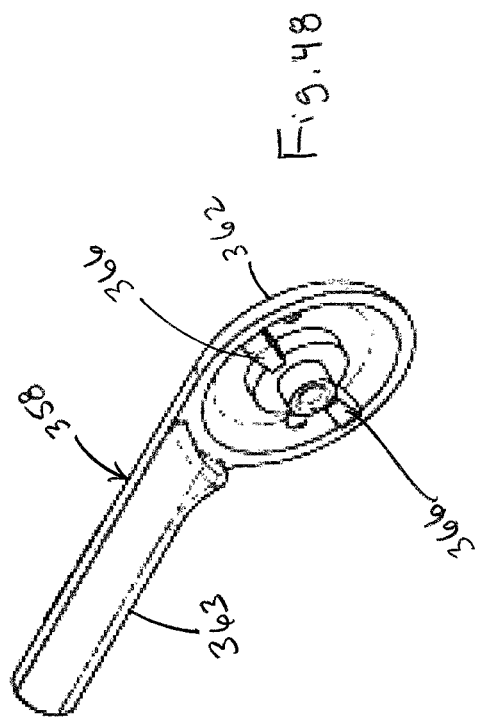
FIG. 48 is a perspective view of the second hinge member of FIG. 47.
Figure 50:
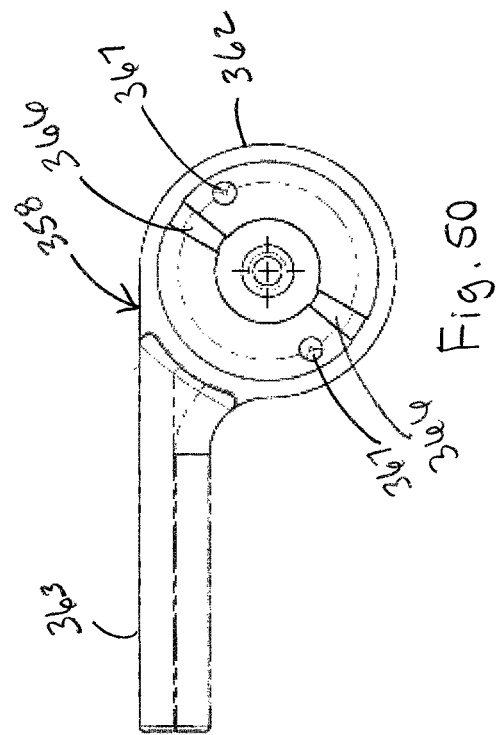
FIG. 50 is an opposite side view of the second hinge member of FIG. 47.
Figure 47:
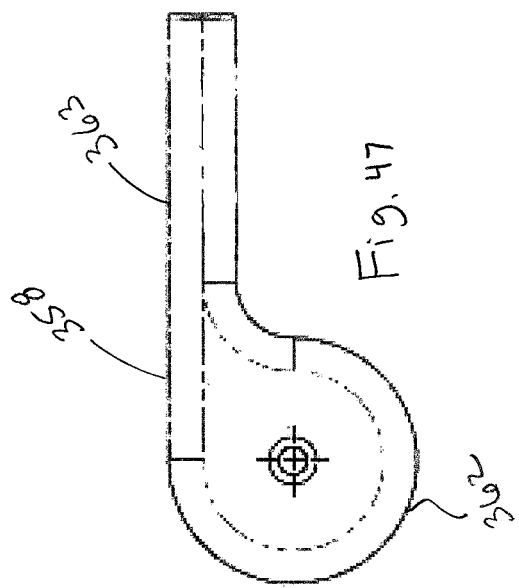
FIG. 47 is a side view of a second hinge member of the corner joint member of FIG. 41.
Figure 49:
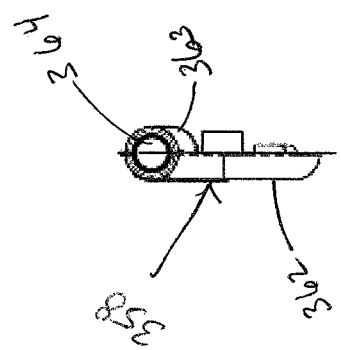
FIG. 49 is an end view of the second hinge member of FIG. 47.

When the first frame support member 12a, the second frame support member 12b and the third frame support member 12c are each coupled to the bracket 224 as described above, the bracket 224 can be used to move the collapsible shade device 10 between its collapsed position (as shown, for example, in FIG. 3) and its erected position (as shown, for example, in FIG. 1). In use, to move the collapsible shade device 10 from its collapsed configuration to its erected position, the first pivot member 227 can be moved from its first position to its second position, and the second pivot member 229 can be moved from its first position to its second position, as described above. When the first pivot member 227 and the second pivot member 229 are each in their second positions, a surface 240 of the second pivot member 229 engages or contacts or abuts a surface 242 of the first pivot member 227, as shown in FIGS. 25 and 27. Thus, the surface 240 can have a contour or shape that mates with, cooperates with or complementarily fits with the surface 242. As shown in FIGS. 25 and 27, the surfaces 240 and 242 are substantially flat, but it should be understood that in other embodiments, the surfaces 240 and 242 can have other shapes and/or contours. For example, in some embodiments, the surface 240 can be convex and the surface 242 can be a corresponding or cooperating concave shape, or vice versa.

With the first pivot member 227 slid downward within the bracket housing via the slot 233, the weight of the first frame support member 12a and the related portion of the fabric layer of the collapsible shade device 10 temporarily maintains the first pivot member 227 in its second position, and the orientation of the second pivot member 229 and engagement of the surfaces 241 and 242 can temporarily maintain the second pivot member 229 in its second position. Thus, when first pivot member 227 and the second pivot member 229 are each in their respective second positions, a gravity lock is formed, and the collapsible shade device 10 will be maintained in its erected position.

To move the collapsible shade device 10 to its collapsed position from the erected position, the first pivot member 227 and the second pivot member 229 can be moved to their respective first positions. Specifically, the first pivot member 227 can be slid upward until the first pin 230 is disposed at or near a second end portion 243 (see e.g., FIGS. 34 and 35) of the slot 233, which will provide clearance to the second pivot member 229 to be pivoted about second pin 230' to its first position. The first pivot member 227 can then be pivoted about pin 230' to be placed back in its first position, as shown in FIGS. 20-22.

FIGS. 40-50 illustrate an embodiment of a corner joint member 354 that can be used, for example, in place of joint 54, in a collapsible shade device (e.g., collapsible shade device 10) described herein. For example, corner joint members 354 can be used in a similar manner as the joints 54 to pivotally couple the legs 14a, 14b, 14c of the frame support members 12a, 12b, 12c to the top members 16, and to couple the legs 44 to the top member 52 of the awning support member 46. The corner joint member 354 includes a first hinge member 356 and a second hinge member 358 pivotally coupled together with a pin 330 and nut 331, as shown, for example, in FIG. 42.

The corner joint member 354 can be moved between a collapsed position (not shown) and an erected position (as shown in FIGS. 40 and 41) by moving (e.g., pivoting) the first hinge member 356 and the second hinge member 358 relative to each other. As shown in FIG. 41, when the corner joint member 354 is in the erected position, an axis C-C defined by the first hinge member 356 is disposed at an angle θ from an axis D-D defined by the second hinge member 358. In some embodiments, the angle θ between the first hinge member 356 and the second hinge member 358 can be ninety-five degrees (95°). By extending the first hinge member 356 and the second hinge member 358 at an angle of 95°, the interior region defined by the collapsible shade device 10 (and fabric layer 18) can be increased. In addition the frame support members (e.g., 12a, 12b, 12c) can be flared outward (e.g., the support members can be curved or non-linear) providing additional strength to the collapsible shade device 10. In alternative embodiments, other angles are also possible. For example, the angle θ can be any angle between 45° and 270°. To move the corner joint member 354 from its erected position to its collapsed position, the first hinge member 356 and the second hinge member 358 are moved or folded toward each other in the direction of arrows B shown in FIG. 41.

The first hinge member 356 includes a first mount portion 359 and an elongate portion 360, as shown in FIGS. 43-46. The elongate portion 360 defines a channel 361 that can receive one of the legs 14a, 14b. 14c, 44 therein. The legs 14a, 14b. 14c, 44 can be coupled to the elongate portion 360 with, for example, an adhesive, welding, a pin connection, friction fit, etc. The second hinge member 358 includes a second mount portion 362 and an elongate portion 363. The elongate portion 363 defines a channel 364 that can receive one of the top members 16, 52. The top members 16, 52 can be coupled to the elongate portion 363 with, for example, an adhesive, welding, a pin connection, friction fit, etc. It should be understood, that in alternative embodiments, the channel 361 of the first hinge member 356 can receive the top members 16 or 52, and the channel 364 can receive the legs 14a, 14b, 14c, 44.

The first mount portion 359 of the first hinge member 356 includes a pair of ramps 365 and the second mount portion 362 of the second hinge member 358 includes a pair of ramps 366 (also referred to as "stops", "protrusions" and "projections"). The second mount portion 362 of the second hinge member 358 also includes a pair of nubs or detents 367. The ramps 365 and the ramps 366 can be used to control the range of motion of the first hinge member 356 and second hinge member 358 relative to each other. For example, when the first hinge member 356 is coupled to the second hinge member 358, the radial position of the ramps 365 and the radial position of the ramps 366 are such that they can provide a stop to prevent over rotation of the first hinge member 356 and the second hinge member 358 when the corner joint member 354 is moved from its collapsed position to its erected position and/or when the corner joint member 354 is moved from its erected position to its collapsed position. The nubs 367 can provide a friction lock to temporarily maintain the corner joint member 354 in the erected position. For example, when the first hinge member 356 and the second hinge member 358 are pivoted away from each other to move the corner joint member 354 from its collapsed position to its erected position, the ramps 365 of the first hinge member 356 can be moved past the nubs 367 to temporarily lock the first hinge member 356 and the second hinge member 358 at the desired angle θ relative to each other. While in the erected position, the ramps 365 of the first hinge member 356 are disposed between the nubs 367 and the ramps 366 of the second hinge member 358.

In a similar manner as described above for collapsible shade device 10, when the legs 14a, 14b, 14c, 44 are pivotally coupled to the top members 16, 52 using corner joint members 354, the corner joint members 354 can be used in conjunction with the brackets 24 or brackets 224 (whichever are being used) to move the collapsible shade device 10 between its collapsed position and its erected position.

In some embodiments, a collapsible shade device (e.g., 10, 10a) as described herein can include a fabric member (e.g., fabric layer 18) that is removably coupled to the frame support members. For example, in some embodiments, the fabric member can be coupled to the frame support members using a Velcro attachment. In some embodiments, the fabric member is oversized such that the frame support members can be placed within a fold or overlap portion of the fabric member.

In some embodiments, the fabric member can be formed as a single unitary piece that is coupled to the frame support members. In some embodiments, the floor or seat portion of the fabric member (e.g., seat portion 20) can be a separate component from the remaining portion of the fabric member and removably attachable to the remaining portion of the fabric member. In some embodiments, a collapsible shade device as described herein may not include a floor or seat portion. In some embodiments, the fabric member can include a window or screen portion, for example, on a back portion of the fabric member to allow a user to see out of the collapsible shade device.

The legs (e.g., 14a, 14b, 14c, 44, 112a, 112b, 112c,) of the frame support members (e.g., 12a, 12b, 12c, 112) and awning support member (e.g., 46) described herein can be formed from a variety of different materials. For example, the legs can be formed with bamboo, wood, aluminum, steel, fiberglass, extruded ABS, and/or a variety of different types of suitable plastic materials, etc.

The above description is given by way of example, and not limitation. Given the above disclosure, one skilled in the art could devise variations that are within the scope and spirit of the invention disclosed herein, including various ways of telescoping the legs. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus, comprising:
    a first frame support member including a first leg and a second leg;
    a second frame support member including a first leg and a second leg;
    a third frame member including a first leg and a second leg;
    a pair of bracket assemblies connected to the support members so that the first legs of the support members are connected to one bracket assembly and the second legs of the support members are connected to the other bracket assembly;
    said bracket assemblies configured to enable the apparatus to be moved between a collapsed position and an erect position and each bracket assembly having a housing including
        a channel that is parallel to a support surface for the apparatus and receives therein one leg the third frame member that is stationary with respect to the bracket assembly,
        a first pivot member having a longitudinal range of motion along a first pivot point of the bracket assembly and a pivotal range of motion about the first pivot point, and
        a second pivot member having a pivotal range of motion about a second pivot point of the bracket assembly, said second pivot member disposed between the channel and the first pivot point,
    the first pivot member being movable between a first position in which the first support member is in an erected position and a second position in which the first frame support member in a collapsed position
    the second pivot member being movable between a first position in which the second frame support is in an erected position and a second position in which the second frame support member is in a collapsed position,
    said first and second pivot members each having complementary surfaces that engage when the apparatus is in the erect position.

2. The apparatus of claim 1 where each bracket assembly includes a slot interactive with the first pivot member to enable the first pivot member to be slid in downward direction when in the erect position.

* * * * *